(12) United States Patent
Knauss et al.

(10) Patent No.: US 11,745,148 B2
(45) Date of Patent: Sep. 5, 2023

(54) FUNCTIONALIZED POLY(DIALLYLPIPERIDINIUM) AND ITS COPOLYMERS FOR USE IN ION CONDUCTING APPLICATIONS

(71) Applicants: Daniel M. Knauss, Golden, CO (US); Derek J. Strasser, Parker, CO (US)

(72) Inventors: Daniel M. Knauss, Golden, CO (US); Derek J. Strasser, Parker, CO (US)

(73) Assignee: Colorado School of Mines, Golden, CO (US)

(*) Notice: Subject to any disclaimer, the term of this patent is extended or adjusted under 35 U.S.C. 154(b) by 0 days.

(21) Appl. No.: 17/180,629

(22) Filed: Feb. 19, 2021

(65) Prior Publication Data
US 2021/0178340 A1   Jun. 17, 2021

Related U.S. Application Data

(62) Division of application No. 16/109,618, filed on Aug. 22, 2018, now abandoned.
(Continued)

(51) Int. Cl.
*B01D 71/62* (2006.01)
*C08L 53/00* (2006.01)
(Continued)

(52) U.S. Cl.
CPC ......... *B01D 71/62* (2013.01); *B01D 67/0009* (2013.01); *B01D 67/0013* (2013.01);
(Continued)

(58) Field of Classification Search
CPC .......................... B01D 71/62; B01D 67/0009; B01D 67/0013; B01D 67/0093; B01D 71/76;
(Continued)

(56) References Cited

U.S. PATENT DOCUMENTS 5,242,986 A    9/1993  Gibler et al.
5,500,323 A *  3/1996  Baur .................... G03G 9/0975
                                                  430/108.22
(Continued)

FOREIGN PATENT DOCUMENTS

WO    WO 2009/083509    7/2009

OTHER PUBLICATIONS

Strasser et al. "Base stable poly(diallylpiperidinium hydroxide) multiblock copolymers for anion exchange membranes," Journal of Material Chemistry, A 2017, 5, 9627.*
(Continued)

*Primary Examiner* — Krishnan S Menon
(74) *Attorney, Agent, or Firm* — Sheridan Ross P.C.

(57) ABSTRACT

The invention relates to membranes, monomers and polymers. The monomers can form polymers, which can be used for membranes. The membranes can be used in alkaline fuel cells, for water purification, for electrolysis, for flow batteries, and for anti-bacterial membranes and materials, as well as membrane electrode assemblies for fuel cells. In addition to the membranes, polymers and monomers and methods of using the membranes, the present invention also relates to methods of making the membranes, monomers and polymers.

14 Claims, 17 Drawing Sheets

Related U.S. Application Data

(60) Provisional application No. 62/548,575, filed on Aug. 22, 2017.

(51) Int. Cl.

| | | |
|---|---|---|
| C08L 81/06 | (2006.01) | |
| C08G 81/02 | (2006.01) | |
| H01M 8/1032 | (2016.01) | |
| B01D 71/76 | (2006.01) | |
| H01M 8/1067 | (2016.01) | |
| H01M 8/1072 | (2016.01) | |
| C08L 81/02 | (2006.01) | |
| B01D 67/00 | (2006.01) | |
| C08G 75/20 | (2016.01) | |
| B01D 71/80 | (2006.01) | |
| C08J 5/22 | (2006.01) | |
| C08G 75/045 | (2016.01) | |
| H01M 8/1081 | (2016.01) | |
| B01D 71/82 | (2006.01) | |
| C08K 3/38 | (2006.01) | |
| C08K 3/32 | (2006.01) | |
| C08L 39/04 | (2006.01) | |
| H01M 8/083 | (2016.01) | |
| B01D 71/68 | (2006.01) | |

(52) U.S. Cl.
CPC ......... *B01D 67/0093* (2013.01); *B01D 71/76* (2013.01); *B01D 71/80* (2013.01); *B01D 71/82* (2013.01); *C08G 75/045* (2013.01); *C08G 75/20* (2013.01); *C08G 81/024* (2013.01); *C08J 5/2262* (2013.01); *C08L 53/00* (2013.01); *C08L 81/02* (2013.01); *C08L 81/06* (2013.01); *H01M 8/1032* (2013.01); *H01M 8/1067* (2013.01); *H01M 8/1072* (2013.01); *H01M 8/1081* (2013.01); *B01D 71/68* (2013.01); *B01D 2257/80* (2013.01); *B01D 2323/08* (2013.01); *C08J 2381/06* (2013.01); *C08K 3/32* (2013.01); *C08K 3/38* (2013.01); *C08L 39/04* (2013.01); *H01M 8/083* (2013.01)

(58) Field of Classification Search
CPC ........ B01D 71/80; B01D 71/82; B01D 71/68; B01D 2257/80; B01D 2323/08; C08G 75/045; C08G 75/20; C08G 81/024; C08J 5/2262; C08J 2381/06; C08L 53/00; C08L 81/02; C08L 81/06; C08L 39/04; H01M 8/1032; H01M 8/1067; H01M 8/1072; H01M 8/1081; H01M 8/083; C08K 3/32; C08K 3/38; Y02E 60/50; Y02P 70/50

See application file for complete search history.

(56) References Cited

U.S. PATENT DOCUMENTS

| | | | |
|---|---|---|---|
| 5,550,005 | A | 8/1996 | Berrier et al. |
| 6,423,784 | B1 | 7/2002 | Hamrock et al. |
| 2010/0222208 | A1 | 9/2010 | Matsuoka et al. |
| 2015/0017566 | A1 | 1/2015 | Watanabe et al. |
| 2017/0326540 | A1* | 11/2017 | Meier-Haack ....... A61K 31/785 |
| 2019/0118144 | A1 | 4/2019 | Kishino et al. |

OTHER PUBLICATIONS

Arges et al., "The Chalkboard: Anion Exchange Membrane Fuel Cells," The Electrochemical Society Interface, vol. 19, No. 2, Summer 2010, pp. 31-35.

Assem et al., "Microwave-Assisted Controlled Ring-Closing Cyclopolymerization of Diallyldimethylammonium Chloride Via the RAFT Process," Macromolecular Rapid Communications, vol. 28. No. 18-19, Sep. 2007 pp. 1923-1928, abstract only.

Baker et al., "Cerium Ion Mobility and Diffusivity Rates in Perfluorosulfonic Acid Membranes Measured via Hydrogen Pump Operation," Journal of the Electrochemical Society, vol. 164, No. 12, 2017, pp. F1272-F1278.

Baker et al., "Cerium Migration during PEM Fuel Cell Accelerated Stress Testing," Journal of the Electrochemical Society, vol. 163, No. 9, 2016, pp. F1023-F1031.

Baker et al. "Zr-doped ceria additives for enhanced PEM fuel cell durability and radical scavenger stability," Journal of Materials Chemistry A, vol. 5, No. 29, pp. 15073-15079.

Banham et al., "UV-visible spectroscopy method for screening the chemical stability of potential antioxidants for proton exchange membrane fuel cells," Journal of Power Sources, vol. 281, May 2015, pp. 238-242, abstract only.

Bates et al., "Block Copolymer Thermodynamics: Theory and Experiment," Annual Review of Physical Chemistry, vol. 41, 1990, pp. 525-557.

Bauer et al., "Anion-exchange membranes with improved alkaline stability," Desalination, vol. 79, No. 2-3, Dec. 1990, pp. 125-144, abstract only.

Blinco et al., "Living characteristics of the free-radical ring-closing polymerization of diallyldimethylammonium chloride," European Polymer Journal, vol. 47, No. 1, Jan. 2011, pp. 111-114, abstract only.

Borup et al., "Scientific Aspects of Polymer Electrolyte Fuel Cell Durability and Degradation," Chemical Reviews, vol. 107, No. 10, 2007, pp. 3904-3951.

Brooker et al., "Decreasing Membrane Degradation through Heteropolyacid Sub-layers," Journal of the Electrochemical Society, vol. 160, No. 1, 2013, pp. F75-F80, abstract only.

Bultmann et al., "Competition between Geminate Recombination and Solvation of Polar Radicals following Ultrafast Photodissociation of Bis(p-aminophenyl) Disulfide," Journal of Physical Chemistry, vol. 100, No. 50, 1996, pp. 19417-19424, abstract only.

Butler et al., "Preparation and Polymerization of Unsaturated Quaternary Ammonium Compounds," Journal of the American Chemical Society, vol. 71, No. 9, 1949, pp. 3120-3122, abstract only.

Butler et al., "Preparation and Polymerization of Unsaturated Quaternary Ammonium Compounds. VIII. A Proposed Alternating Intramolecular-Intermolecular Chain Propagation," Journal of the American Chemical Society, vol. 79, No. 12, pp. 3128-3131, abstract only.

Butler, "Cyclopolymerization," Polymer Chemistry, vol. 38, No. 19, Oct. 2000, pp. 3451-3461.

Caire et al., "Mechanical testing of small, thin samples in a humidity-controlled oven," Rheologica Acta, vol. 54, No. 4, Apr. 2014, pp. 253-261, abstract only.

Chen et al., "Dual role study of 12-molybdophosphoric acid on styrene polymerization," Journal of Molecular Catalysis A, vol. 208, No. 1-2, Feb. 2004, pp. 91-95, abstract only.

Cheng et al., "A mini-review on anion exchange membranes for fuel cell applications: Stability issue and addressing strategies," International Journal of Hydrogen Energy, vol. 40, No. 23, May 4, 2015, pp. 7348-7360.

Clouet et al., "Free radical synthesis of α,ω-primary amino functionalized polyisoprene through the functional thermal inferter [bis(N-(2-phthalimldoethyl)piperazine)]thiuram disulfide," Macromolecular Chemistry and Physics, vol. 195, No. 1, Jan. 1994, pp. 243-251, abstract only.

Curtin et al., "Advanced materials for improved PEMFC performance and life," Journal of Power Sources, vol. 131, No. 1-2, May 2004, pp. 41-48.

Dang et al., "Alkali-stable and highly anion conducting poly(phenylene oxide)s carrying quaternary piperidinium cations," Journal of Materials Chemistry A, vol. 4, No. 30, 2016, pp. 11924-11938, abstract only.

Destarac et al., "Aqueous MADIX/RAFT polymerizatic of diallyldimethylammonium chloride: Extension to the synthesis of

(56) References Cited

OTHER PUBLICATIONS poly(DADMAC)-based double hydrophilic block copolymers," Journal of Polymer Science A, vol. 48, No. 22, Nov. 2010, pp. 5163-5171, abstract only.
Dizman et al., "Recent advances in the preparation of functionalized polysulfones," Polymer International, vol. 62, 2013, pp. 991-1007, abstract only.
Notice of Allowance for U.S. Appl. No. 17/096,483, dated Mar. 4, 2022, 9 pages.
Duncan et al., "Mechanism and Dynamics in the H3[PW12O40]-Catalyzed Selective Epoxidation of Terminal Olefins by H2O2. Formation, Reactivity, and Stability of {PO4[WO(O2)2]4}3-," Journal of the American Chemical Society, vol. 117, No. 2, 1995, pp. 681-691, abstract only.
Edson et al., "Thianthrene as an activating group for the synthesis of poly(aryl ether thianthrene)s by nucleophilic aromatic substitution," Journal of Polymer Science A, vol. 42, No. 24, Dec. 2004, pp. 6353-6363, abstract only.
Ertem et al., "Photo-Cross-Linked Anion Exchange Membranes with Improved Water Management and Conductivity," Macromolecules, vol. 49, No. 1, 2016, pp. 153-161.
Fischer et al., "Poly(diallyldimethylammonium chlorides) and their N-methyl-N-vinylacetamide copolymer-based DNA-polyplexes: role of molecular weight and charge density in complex formation, stability, and in vitro activity," International Journal of Pharmaceutics, vol. 280, No, 12, Aug. 2004, pp. 253-269, abstract only.
Ghassemi et al., "Multiblock sulfonated-fluorinated poly(arylene ether)s for a proton exchange membrane fuel cell," Polymer, vol. 47, No. 11, May 2006, pp. 4132-4139, abstract only.
Gu et al., "Base Stable Pyrrolidinium Cations for Alkaline Anion Exchange Membrane Applications," Macromolecules, vol. 47, No, 19, 2014, pp. 6740-6747, abstract only.
Gu et al., "Quaternary Phosphonium-Based Polymers as Hydroxide Exchange Membranes," ChemSusChem, vol. 3, No. 5, May 2010, pp. 555-558, abstract only.
Gubler et al., "Kinetic Simulation of the Chemical Stabilization Mechanism in Fuel Cell Membranes Using Cerium and Manganese Redox Couples," Journal of the Electrochemical Society, vol. 159, No. 2, 2012, pp. B211-B218.
Haugen et al., "The Effect of Heteropoly Acids on Stability of PFSA PEMs under Fuel Cell Operation," Electrochemical and Solid-State Letters, vol. 10, No. 3, 2007, pp. B51-B55, abstract only.
He et al., "Dual-cation comb-shaped anion exchange membranes: Structure, morphology and properties," Journal of Membrane Science, vol. 515, Oct. 2016, pp. 189-195, abstract only.
Herring et al., "Inorganic-Polymer Composite Membranes for Proton Exchange Membrane Fuel Cells," Journal of Macromolecular Science C, vol. 46, No. 3, 2006, pp. 245-296, abstract only,.
Hibbs et al., "Synthesis and Characterization of Poly(phenylene)-Based Anion Exchange Membranes for Alkaline Fuel Cells," Macromolecules, vol. 42, No. 21, 2009, pp. 8316-8321, abstract only.
Horan et al., "Cover Picture: Copolymerization of Divinylsilyl-11-silicotungstic Acid with Butyl Acrylate and Hexanediol Diacrytate: Synthesis of a Highly Proton-Conductive Membrane for Fuel-Cell Applications (ChemSusChem Mar. 2009)." ChemSusChem, vol. 2, No. 3, Mar. 2009, p. 193, abstract only.
Horan et al., "Fast Proton Conduction. Facilitated by Minimum Water in a Series of Divinylsilyl-11-silicotungstic Acid-co-Butyl Acrylate-co-Hexanediol Diacrylate Polymers," Journal of Physical Chemistry C, vol. 118, No. 1, 2014, pp. 135-144.
Hossain et al., "Comparison of alkaline fuel cell membranes of random & block poly(arylene ether sulfone) copolymers containing tetra quaternary ammonium hydroxides," International Journal of Hydrogen Energy, vol. 39, No. 6, Feb. 2014, pp. 2731-2739, abstract only.
Hugar et al., "Imidazolium Cations with Exceptional Alkaline Stability: A Systematic Study of Structure-Stability Relationships," Journal of the American Chemical Society, vol. 137, 2015, pp. 8730-8737.
James et al., "Hydration of Nafion® studied by AFM and X-ray scattering," Journal of Materials Science, vol. 35, No. 20, Oct. 2000, pp. 5111-5119, abstract only.
Janik et al., "A Quantum Chemical Study of the Decomposition of Keggin-Structured Heteropoiyacids," Journal of Physical Chemistry B, vol. 110, No. 9. 2006, pp. 4170-4178, abstract only.
Jannasch et al., "Configuring Anion-Exchange Membranes for High Conductivity and Alkaline Stability by Using Cationic Polymers with Tailored Side Chains," Macromolecular Chemistry and Physics, vol. 217, No. 10, May 2016, pp. 1108-1118, abstract only.
Jouannet et al., "Calorimetric study of fluorinated methacrylic and vinyl polymer blends: 1. Binary systems: determination of miscibility domains and correlation of glass transition temperatures with blends composition—application to plastic optical fibre cladding," Polymer, vol. 38, No. 2, Sep. 1997, pp. 5137-5147, abstract only.
Jun et al., "Reinvestigation of Photoinitiation Mechanism and Kinetics of Aryl Disulfides," Journal of Photopolymer Science and Technology, vol. 8, No. 1, 1995, pp. 155-162.
Kamata et al., "Efficient Epoxidation of Olefins with ≥99% Selectivity and Use of Hydrogen Peroxide," Science, vol. 300, No. 5621, May 2003, pp. 964-966.
Karibyants et al., "Characterization of PSS/PDADMAC-co-AA Polyelectrolyte Complexes and Their Stoichiometry Using Analytical Ultracentrifugation," Macromolecules, vol. 30, No. 25, 1997, pp. 7803-7809, abstract only.
Kilcher et al., "Role of thiol-disulfide exchange in episulfide polymerization," Journal of Polymer Science A, vol. 46, No. 6, Mar. 2008. pp. 2233-2249, abstract only.
Kim et al., "Synthesis, structure, spectroscopic properties, and hydrolytic chemistry of organophosphonoyl polyoxotungstates of formula [C6H5P(O)]2Xn+W11O39(8-n)-(Xn+= P5+, Si4+)," Inorganic Chemistry, vol. 31, No. 25, 1992, pp. 5316-5324, abstract only.
Klingele et al., "Direct deposition of proton exchange membranes enabling high performance hydrogen fuel cells," Journal of Materials Chemistry A, vol. 3, No, 21, 2015. pp. 11239-11245.
Knauss et al., "Poly(aryl ether sulfide)s by sulfide-activated nucleophilic aromatic substitution polymerization," Polymer, vol. 47, No. 11, May 2006, pp. 3996-4003, abstract only.
Kobayashi et al., "Ring-opening copolymerization of 2,4-bisphenyl-1,3,2,4-dioxadiphosphetane-2,4-dioxide with oxetane via zwitterion intermediates," Polymer bulletin, vol. 16, No. 4. Oct. 1986, pp. 269-276, abstract only.
Kodaira, "Structural control during the cyclopolymerization of unconjugated dienes," Progress in Polymer Science, vol. 25, No. 5, Jun. 2000, pp. 627-676, abstract only.
Kong et al., "Determination of the Structure of a Novel Anion Exchange Fuel Cell Membrane by Solid-State Nuclear Magnetic Resonance Spectroscopy," Macromolecules, vol. 42, No. 5. 2009, pp. 1659-1664, abstract only.
Kongkanand et al., "The Priority and Challenge of High-Power Performance of Low-Platinum Proton-Exchange Membrane Fuel Cells," Journal of Physical Chemistry Letters, vol. 7, No, 7, 2016, pp. 1127-1137, abstract only.
Kundu et al., "Morphological features (defects) in fuel cell membrane electrode assemblies," Journal of Power Sources, vol. 157, No. 2, Jul. 2006, pp. 650-656, abstract only,.
Kusoglu et al., "Electrochemical/Mechanical Coupling in Ion-Conducting Soft Matter," Journal of Physical Chemistry Letters, vol. 6, No. 22, 2015, pp. 4547-4552.
Kusoglu et al., "New Insights into Perfluorinated Sulfonic-Acid Ionomers," Chemical Reviews, vol. 117, No. 3, 2017, pp. 987-1104.
Lalevee et al., "Thiyl Radical Generation in Thiol or Disulfide Containing Photosensitive Systems," Macromolecular Chemistry and Physics, vol. 210, No. 5, Mar. 2009, pp. 311-319, abstract only.
Lancaster et al., "The structure of poly(diallyldimethyl-ammonium) chloride by 13C-NMR spectroscopy," Polymer Letters, vol. 14, No, 9. Sep. 1976, pp. 549-554, abstract only.
Lee et al., "Hydrophilic-Hydrophobic Multiblock Copolymers Based on Poly(arylene ether sulfone) via Low Temperature Coupling Reactions for Proton Exchange Membrane Fuel Cells," Polymer, vol. 49, No. 3, 2008, pp. 715-723.

(56) References Cited

OTHER PUBLICATIONS

Lee et al., "Morphological transformation during cross-linking of a highly sulfonated poly(phenylene sulfide nitrile) random copolymer," Energy & Environmental Science, vol. 5, No. 12, 2012, pp. 9795-9802, abstract only.

Leibler, "Theory of Microphase Separation in Block Copolymers," Macromolecules, vol. 13. No. 6, 1980, pp. 1602-1617, first page only.

Li et al., "A new class of highly-conducting polymer electrolyte membranes: Aromatic ABA triblock copolymers," Energy & Environmental Science, vol. 5, No. 1, 2012, pp. 5346-5355.

Li et al., "Poly(2,6-dimethyl-1,4-phenylene oxide) Blended with Poly(vinylbenzyl chloride)-b-polystyrene for the Formation of Anion Exchange Membranes," Macromolecules, vol. 47, No. 19, 2014, pp. 6757-6767, abstract only.

Li et al., "Polyethylene-Based Block Copolymers for Anion Exchange Membranes," Macromolecules, vol. 48, No. 18, 2015, pp. 6523-6533, abstract only,.

Li et al., "Synthesis and properties of anion conductive multiblock copolymers containing tetraphenyl methane moieties for fuel cell application," Journal of Membrane Science, vol. 436, Jun. 2013, pp. 202-212, abstract only.

Li et al., "Synthesis and properties of multiblock ionomers containing densely functionalized hydrophilic blocks for anion exchange membranes," Journal of Membrane Science, vol. 467, 2014, pp. 1-12, abstract only.

Liu et al., "A Small-Angle X-ray Scattering Study of the Development of Morphology in Films Formed from the 3M Perfluorinated Sulfonic Acid Ionomer," Macromolecules, vol. 45, No. 18, 2012, pp. 7495-7503, abstract only.

Liu et al., "An ion exchange membranes composed of a poly(2,6-dimethyl-1.4-phenylene oxide) random copolymer functionalized with a bulky phosphonium cation," Journal of Membrane Science, vol. 506, No. C, 2016, 38 pages.

Liu et al., "Anion Transport in a Chemically Stable, Sterically Bulky α-C Modified Imidazolium Functionalized Anion Exchange Membrane," Journal of Physical Chemistry C, vol. 118, No. 28, 2014, pp. 15136-15145.

Logothetis et al., "Chemistry of fluorocarbon elastomers," Progress in Polymer Science, vol. 14, No. 2, 1989, pp. 251-296, abstract only,.

Macomber et al., "Decomposition pathways of an alkaline fuel cell membrane material component via evolved gas analysis," Journal of Thermal Analysis and Calorimetry, vol. 93, No. 1, Jul. 2008, pp. 225-229, abstract only.

Malers et al., "Studies of heteropoly acid/polyvinylideneidifluoride-hexafluoroproylene composite membranes and implication for the use of heteropoly acids as the proton conducting component in a fuel cell membrane," Journal of Power Sources, vol. 172, No. 1, Oct. 2007, pp. 83-88, abstract only.

Marino et al., "Alkaline Stability of Quaternary Ammonium Cations for Alkaline Fuel Cell Membranes and Ionic Liquids," ChemSusChem, vol. 8, No. 3, Feb. 2015, pp. 513-523.

Matsumoto, "Polymerization of multiallyl monomers," Progress in Polymer Science, vol. 26, No, 2, Mar. 2001, pp. 189-257, abstract only.

Maurya et al., "Stability of composite anion exchange membranes with various functional groups and their performance for energy conversion," Journal of Membrane Science, vol. 443, Sep. 2013, pp. 28-35, abstract only.

Mayer et al., "Organic-Inorganic Hybrids Based on Polyoxometalates, 5.1 Synthesis and Structural Characterization of Bis(organophosphoryl)decatungstosilicates [γ-SiW10O36 ((RPO)2]4-," Inorganic Chemistry, vol. 38, No. 26, 1999, pp. 6152-6158, abstract only.

Meek et al., "Alkaline Chemical Stability and Ion Transport in Polymerized Ionic Liquids with Various Backbones and Cations," Macromolecules. vol. 49, No. 9, 2016, pp. 3382-3394, abstract only.

Meng et al., "Synthesis of macrocyclic aliphatic disulfide oligomers from dithiols by oxidative coupling with oxygen using a copper-amine catalyst," Polymers for Advanced Technologies, vol. 15, No, 9, Sep. 2004, pp. 564-566, abstract only.

Merle et al., "Anion exchange membranes for alkaline fuel cells: A review," Journal of Membrane Science, vol. 377, No. 1-2, Jul. 2011, pp. 1-35.

Morgan et al., "Studies on the Synthesis. Stability and Conformation of 2-Sulfonyl-Oxetane Fragments," Organic & Biomolecular Chemistry, vol. 13, 2015, pp. 5265-5272.

Motz et al., "Synthesis of a Polymer Electrolyte Based on Silicotungstic Acid, Performance, and Mechanical Durability in a Proton Exchange Membrane Fuel Cell," ECS Transactions, vol. 80, No. 8, 2017, pp. 565-570, abstract only.

Nakamura et al., "High-Conductivity Solid Proton Conductors: Dodecamolybdophosphorio Acid and Dodecatungstophosphoric Acid Crystals," Chemistry Letters, vol. 8, No, 1, 1979, pp, 17-18.

Neelakandan et al., "Fabrication and electrochemical properties of surface modified sulfonated poly(vinylidenefluoride-co-hexafluoropropylene) membranes for DMFC application," Solid State Ionics, vol. 268, Pt. A, Dec. 2014, pp. 35-41, abstract only.

Negi et al., "Cyclopolymerization of diallylamine derivatives in dimethyl sulfoxide," Journal of Polymer Science A, vol. 5, No, 8, Aug. 1967, pp. 1951-1965, abstract only.

Noonan et al., "Phosphonium-Functionalized Polyethylene. A New Class of BaseStable Alkaline Anion Exchange Membranes," Journal of the American Chemical Society, vol. 134, No. 44, 2012, pp. 18161-18164.

Nunez et al., "N-Alkyl Interstitial Spacers and Terminal Pendants Influence the Alkaline Stability of Tetraalkyfammonium Cations for Anion Exchange Membrane Fuel Cells," Chemistry of Materials, vol. 28, No. 8, 2016, pp. 2589-2598, abstract only.

Ohma et al., "Membrane Degradation Behavior during Open-Circuit Voltage Hold Test," Journal of the Electrochemical Society, vol. 154, No. 8, 2007, pp. B757-B760, abstract only.

Ohma et al., "Membrane degradation mechanism during open-circuit voltage hold test," Journal of Power Sources, vol. 182. No. 1, Jul. 2008, pp. 39-47, abstract only.

Otsu, "Iniferter concept and living radical polymerization," Journal of Polymer Chemistry, vol. 38, No. 12, Jun. 2000, pp. 2121-2136.

Pandey et al., "A Highly Hydroxide Conductive, Chemically Stable Anion Exchange Membrane, Poly(2,6 dimethyl 1,4 phenylene oxide)-b-Poly(vinyl benzyl trimethyl ammonium), for Electrochemical Applications," Journal of the Electrochemical Society, vol. 163, No. 7, 2016, pp. H513-H520.

Pandey et al., "Insight on Pure vs Air Exposed Hydroxide Ion Conductivity in an Anion Exchange Membrane for Fuel Cell Applications," ECS Transactions, vol. 64, No. 3, Oct. 2014, pp. 1195-1200.

Pandey et al., "Interplay between water uptake, ion interactions, and conductivity in an e-beam grafted poly(ethylene-co-tetrafluoroethylene) anion exchange membrane," Physical Chemistry Chemical Physics, vol. 17, No. 6, 2015, pp. 4367-4378.

Pandey et al., "Novel Processing of a Poly(phenyleneoxide)-b-Poly(vinylbenzyltrimethylammonium) Copolymer Anion Exchange Membrane; The Effect On Mechanical And Transport Properties," Electrochimica Acta, vol. 222, 2016, pp. 1545-1554, abstract only.

Pham et al., "Aromatic Polymers Incorporation Bis-N-spirocyclic Quaternary Ammonium Moieties for Anion-Exchange Membranes," ACS Macro Letters, vol. 4, No. 12, 2015. pp. 1370-1375, abstract only.

Ponce-Gonzalez et al., "High performance aliphatic-heterocyclic benzyl-quaternary ammonium radiation-grafted anion-exchange membranes," Energy and Environmental Science, vol. 9, No. 12, 2016, pp. 3724-3735.

Pribble et al., "Size-Specific Infrared Spectra of Benzene-(H2O)n Clusters (n = 1 through 7): Evidence for Noncyclic (H2O)n Structures," Science, vol. 265, No. 5168, Jul. 1994, pp. 75-79, abstract only.

Price et al., "Relationships between Structure and Alkaline Stability of Imidazolitim Cations for Fuel Cell Membrane Applications," ACS Macro Letters, vol. 3, No. 2, 2014, pp. 160-165, abstract only.

(56) References Cited

OTHER PUBLICATIONS

Pryor et al., "Reactions of Radicals. Rates of Chain Transfer of Disulfides and Peroxides with the Polystyryl Radical," Journal of the American Chemical Society, vol. 64, No, 14, 1962, pp. 2705-2711, first page only.

Ramani et al., "Stabilized heteropolyacid/Nafion® composite membranes for elevated temperature/low relative humidity PEFC operation," Electrochimica Acta, vol. 50, No, 5, Jan 2005, pp. 1181-1187, abstract only.

Rao et al., "Cardo poly(arylene ether sullone) block copolymers with pendant imidazolium side chains as novel anion exchange membranes for direct methanol alkaline fuel cell," Polymer, vol. 54, No. 26, Dec. 2013, pp. 6918-6928, abstract only.

Refat et al., "Synthesis and spectroscopic characterization of piperidine/I2 charge-transfer complex in different chlorinated organic solvents," Bulgarian Chemical Communications, vol. 43, No. 3, 2010, pp. 439-448.

Robertson et al., "Tunable High Performance Cross-Linked Alkaline Anion Exchange Membranes for Fuel Cell Applications," Journal of the American Chemical Society, vol. 132, No. 10, 2010, pp. 3400-3404, abstract only.

Rocchiccioli-Deltcheff et al., "Vibrational investigations of polyoxometalates. 2. Evidence for anion-anion interactions in molybdenum(VI) and tungsten(VI) compounds related to the Keggin structure," Inorganic Chemistry, vol. 22, No. 2, 1983, pp. 207-216, abstract only.

Sarode et al., "Hydroxide Transport in Next Generation Anion Exchange Membranes," ECS Transactions, vol. 69, No. 17, 2015, pp. 363-367.

Seo et al., "Anion conductive poly(arylene ether sulfone)s containing tetra-quaternary ammonium hydroxide on fluorenyl group for alkaline fuel cell application," Electrochimica Acta, vol. 86, Dec. 2012, pp. 360-365, abstract only.

Shefer et al., "Free-radical telomerization of tert-butyl acrylate in the presence of bis(4-aminophenyl) disulfide as a useful route to amino-terminated telomers of poly(acrylic acid)," Macromolecules, vol. 26, No. 9, 1993, pp. 2240-2245, first page only.

Shi et al., "Synthesis and Proton Conductivity of Partially Sulfonated Poly([vinylidene difluoride-co-hexafluoropropylene]-b-styrene) Block Copolymers," Macromolecules, vol. 38, No. 10, 2005, pp. 4193-4201, abstract only.

Springer et al., "Polymer Electrolyte Fuel Cell Model," Journal of the Electrochemical Society, vol. 138, No. 8, Aug. 1991, pp. 2334-2342.

Stangar et al., "Silicotungstic acid/organically modified silane proton-conducting membranes," Journal of Solid State Electrochemistry, vol. 9, No. 2, Aug. 2004, pp. 106-113.

Starkweather Jr., et al., "Infrared spectra of amorphous and crystalline poly(tetrafluoroethylene)," Macromolecules, vol. 18, No. 9. 1985, pp. 1684-1686, abstract only.

Taguet et al., "Crosslinking of Vinylidene Fluoride-Containing Fluoropolyiners," Crosslinking in Materials Science, 2005, vol. 184, pp. 127-211.

Taguet et al., "Grafting of 4-Hydroxybenzenesulfonic Acid onto Commercially Available Poly(VDF-co-HFP) Copolymers for the Preparation of Membranes," Fuel Cells, vol. 6, No. 5, Oct. 2006, pp. 331-339, abstract only.

Taguet et al., "Grafting of commercially available amines bearing aromatic rings onto poly(vinylidene-co-hexafluoropropene) copolymers," Journal of Polymer Science A, vol. 44, No. 6, Mar. 2006, pp. 1855-1868, abstract only.

Tanaka et al., "Anion Conductive Block Poly(arylene ether)s: Synthesis, Properties, and Application in Alkaline Fuel Cells," Journal of the American Chemical Society, vol. 133, No. 27, 2011, pp. 10646-10654, abstract only.

Tang et al., "Mechanical Properties of a Reinforced Composite Polymer Electrolyte Membrane and its Simulated Performance in PEM Fuel Cells," Journal of Power Sources, vol. 175, No. 2, 2008, pp. 817-825.

Tian et al., "A cleaner two-step synthesis of high purity diallyldimethylammonium chloride monomers for flocculant preparation," Journal of Environmental Sciences, vol. 17, No, 5, 2005, pp. 798-801.

Tobolsky et al., "The Reaction between Styrene and Ring Disulfides: Copolymerization Effected by the Chain Transfer Reaction," Journal of the American Chemical Society, vol. 75, No. 7, 1953, pp. 1757-1757.

Topchiev et al., "Some features of dimethyl diallyl ammonium chloride high conversion polymerization in aqueous solutions," European Polymer Journal, vol. 25, No. 11, 1989. pp. 1095-1098, abstract only.

Trogadas et al., "Degradation Mitigation in Polymer Electrolyte Membranes Using Cerium Oxide as a Regenerative Free-Radical Scavenger," Electrochemical and Solid-State Letters, vol. 11, No. 7, 2008, B113-B116.

Tsai et al., "Thermally Cross-Linked Anion Exchange Membranes from Solvent Processable Isoprene Containing Ionomers," Macromolecules, vol. 48, No. 3, 2015, pp. 655-662.

Valade et al., "Preparation of solid alkaline fuel cell binders based on fluorinated poly(diailyldimethylammonium chloride)s [poly(DADMAC)] or poly(chlorotrifluoroethylene-co-DADMAC) copolymers," Journal of Polymer Science A, vol. 47, No. 8, Apr. 2009, pp. 2053-2058, abstract only.

Vandiver et al., "Effect of hydration on the mechanical properties and ion conduction in a polyethylene-b-poly(vinylbenzyl trimethylammonium) anion exchange membrane," Journal of Membrane Science, vol. 497, Jan. 2016, pp. 67-76, abstract only.

Vandiver et al., "Mechanical Characterization of Anion Exchange Membranes by Extensional Rheology under Controlled Hydration," Journal of the Electrochemical Society, vol. 161, No. 10, 2014, pp. H677-H683.

Vandiver et al., "Mechanical Performance of Polyiosoprene Copolymer Anion Exchange Membranes by Varying Crosslinking Methods," Journal of the Electrochemical Society, vol. 162, No. 4, 2015, pp. H206-H212.

Varcoe et al., "Anion-exchange membranes in electrochemical energy systems," Energy and Environmental Science, vol. 7, No. 10, 2014, pp. 3135-3191.

Varcoe et al., "Poly(ethylene-co-tetrafluoroethylene)-Derived Radiation-Grafted Anion-Exchange Membrane with Properties Specifically Tailored for Application in Metal-Cation-Free Alkaline Polymer Electrolyte Fuel Cells," Chemistry of Materials, vol. 19. No. 10, 2007, pp. 2686-2693, abstract only.

Varcoe et al., "Prospects for Alkaline Anion-Exchange Membranes in Low Temperature Fuel Cells," Fuel Cells, vol. 5, No. 2, Apr. 2005, pp. 187-200.

Wandrey et al., "Diallyldimethylammonium Chloride and its Polymers," Advances in Polymer Science, vol. 145, 1999, pp. 123-183, abstract only.

Wang et al., "Direct polymerization of sulfonated poly(arylene ether sulfone) random (statistical) copolymers: candidates for new proton exchange membranes," Journal of Membrane Science, vol. 197, No. 1-2, Mar. 2002, pp. 231-242, abstract only.

Webb, "A mild, inexpensive and practical oxidation of sulfides," Tetrahedron Letters, vol. 35, No. 21, May 1994, pp. 3457-3460, abstract only.

Xing et al., "Synthesis and characterization of sulfonated poly(ether ether ketone) for proton exchange membranes," Journal of Membrane Science, vol. 229, No. 1-2, Feb. 2004, pp. 95-106.

Xu et al., "Fluorene-containing poly(arylene ether sulfone)s as anion exchange membranes for alkaline fuel cells," Journal of Membrane Science, vol. 457, May 2014, pp. 29-38, abstract only.

Xu et al., "Novel anion exchange membrane based on copolymer of methyl methacrylate, vinylbenzyl chloride and ethyl acrylate for alkaline fuel cells," Journal of Membrane Science, vol. 354, No. 1-2, May 2010, pp. 206-211, abstract only.

Yadav et al., "Empirical Correlations to Predict In-situ Durability of Polymer Electrolyte Membranes in Fuel Cells." ECS Transactions, vol. 53, No. 30, 2013, pp. 187-199, abstract only.

Yang et al., "1,2-Dimethylimidazolium-functionalized cross-linked alkaline anion exchange membranes for alkaline direct methanol

(56) References Cited

OTHER PUBLICATIONS fuel cells," International Journal of Hydrogen Energy, vol. 40, No. 5, Feb. 2015, pp. 2363-2370, abstract only.

Yang et al., "Poly(2,6-dimethyl-1,4-phenylene oxide)-b-poly(vinylbenzyltrimethylammonium) Diblock Copolymers for Highly Conductive Anion Exchange Membranes," Macromolecules, vol. 48, No. 13, 2015, pp. 4471-4480, abstract only.

Zaton et al., "Current understanding of chemical degradation mechanisms of perfluorosulfonic acid membranes and their mitigation strategies: a review." Sustainable Energy Fuels, vol. 1, No. 3, 2017, pp. 409-438.

Zhang et al., "A New Alkali-Stable Phosphonium Cation Based on Fundamental Understanding of Degradation Mechanisms," ChemSusChem, vol. 9, No. 17, Sep. 2016, pp. 2374-2379, abstract only.

Zhang et al., "Achieving Continuous Anion Transport Domains Using Block Copolymers Containing Phosphonium Cations," Macromolecules, vol. 49, No. 13, Jun. 22, 2016, pp. 4714-4722.

Zhang et al., "Anion-Exchange Membranes for Fuel Cells: Synthesis Strategies, Properties and Perspectives," Fuel Cells, vol. 15, No. 6, Dec. 2015, pp. 761-780, abstract only.

Zhang et al., "Tertiary sulfortium as a cationic functional group for hydroxide exchange membranes," RSC Advances, vol. 2, No. 33, 2012, pp. 12683-12685, abstract only.

Zhang, "Synthesis and Characterization of Polymeric Anion Exchange Membranes," University of Massachusetts Amherst Doctoral Dissertation, May 2016, 311 pages.

Official Action for U.S. Appl. No. 16/109,618, dated Feb. 24, 2020, 8 pages. Restriction Requirement.

Official Action for U.S. Appl. No. 16/109,618, dated Oct. 20, 2020, 8 pages.

Official Action for U.S. Appl. No. 16/109,618, dated May 1, 2020, 9 pages.

Official Action for U.S. Appl. No. 16/113,774, dated Mar. 9, 2020, 8 pages. Restriction Requirement.

Official Action for U.S. Appl. No. 16/113,774, dated May 1, 2020, 8 pages.

Notice of Allowance for U.S. Appl. No. 16/113,774 dated Aug. 12, 2020, 8 pages.

Official Action for U.S. Appl. No. 16/150,113, dated Feb. 27, 2020, 8 pages.

Notice of Allowance for U.S. Appl. No. 16/150,113, dated Jun. 19, 2020, 8 pages.

Hu et al., "Fluorenyl-containing Quaternary Ammonium Poly(arylene ether sulfone)s for Anion Exchange Membrane Applications," Fuel Cells, vol. 16, No. 5, Oct. 2016, pp. 557-567.

* cited by examiner

Initiation

Ring closing

Chain extension

Chain Transfer

Termination

FUNCTIONALIZED POLY(DIALLYLPIPERIDINIUM) AND ITS COPOLYMERS FOR USE IN ION CONDUCTING APPLICATIONS

CROSS REFERENCE TO RELATED APPLICATION

This application is a divisional of U.S. patent application Ser. No. 16/109,618, filed on Aug. 22, 2018; and claims priority and the benefit under 35 U.S.C. § 119(e) to U.S. Provisional Patent Application Ser. No. 62/548,575, filed on Aug. 22, 2017. Each of these references is incorporated herein by reference in their entirety.

GOVERNMENT LICENSE RIGHTS

This invention was made with government support under grant W911NF-10-1-0520 awarded by the Army Research Office, and grant EEC1631778 awarded by the National Science Foundation. The government has certain rights in the invention.

FIELD OF THE INVENTION

The invention relates to membranes, monomers and polymers. The monomers can form polymers, which can be used for membranes. The membranes can be used in purification by separations, alkaline fuel cells, for water purification, for electrolysis, for flow batteries, and for anti-bacterial membranes and materials, as well as membrane electrode assemblies for fuel cells. In addition to the membranes, polymers and monomers and methods of using the membranes, the present invention also relates to methods of making the membranes, monomers and polymers.

BACKGROUND

Membranes and membrane electrode assemblies are important for a number of applications whereby ions are conducted or separated, including fuel cells, electrolysis devices, and different types of batteries including flow batteries. Materials are needed that can transport hydroxide ion at varying levels of humidity and temperature while remaining stable under an alkaline environment. Membranes that can be utilized for separation of water from salts, organic materials, biological materials and other impurities are also needed in water purification and desalination. Additionally membranes find use in other separation applications such as vapor distillation. Membranes with cationic functional groups that can serve as anion exchange membranes have particular application in these areas.

The development of anion exchange membranes containing base-stable cations has received significant attention, particularly for application in alkaline fuel cells. As a result, tetraalkylammonium, imidazolium, and phosphonium cations have been modified and probed for their alkaline stability. Some specific heterocyclic and spirocyclic ammonium small molecules were determined to have vastly improved base stability compared with the more typical tetraalkylammonium and imidazolium compounds. Heterocyclic N,N-dimethylpiperidinium, N,N-dimethylpyrrolidinium, and spirocyclic 6-azoniaspiro[5.5]undecane small molecules showed significant base stability, with the latter being the most stable. As a result of the determination of base stability for the small molecules, new polymeric materials containing pyrrolidinium and piperidinium type cations have been investigated as anion exchange membranes that can persist under highly alkaline conditions. Currently, only one example of an anode exchange membrane (AEM) materials bearing spirocyclic ammonium cations exists. However, developing techniques to install stable spirocylic ammonium cationic groups onto a polymer backbone continues to be a challenge.

Cyclopolymerization of diallyl monomers is a chain growth polymerization technique that has been studied for several decades. The defining characteristic is the alternating intra-inter-molecular propagation mechanism in which 5 or 6 membered rings are typically formed. Cationic polymers derived from diallylammonium monomers are a well-established class of materials synthesized via cyclopolymerization with water soluble poly(diallyldimethylammonium chloride) (PDADMAC) produced commercially for many applications. PDADMAC is synthesized from diallyldimethylammonium chloride (DADMAC) by free radical cyclopolymerization, producing 5-membered heterocyclic repeat units. Free radical cyclopolymerization of DADMAC with comonomers has allowed the synthesis of numerous random copolymers for a range of applications. Controlled radical polymerization via reversible addition fragmentation transfer polymerization has also been studied for DADMAC. However, the formation of block copolymers is limited to only one example with water soluble materials having been produced from the sequential polymerization of acrylamide and DADMAC.

SUMMARY

As an analogue of PDADMAC, the cyclopolymerization of diallylpiperidinium chloride (DApipCl) has been reported to yield poly(diallylpiperidinium chloride) (PDApipCl). A structural difference between PDADMAC and PDApipCl is the spirocyclic quaternary ammonium repeat units that are obtained in the PDApipCl materials. To date, there is no literature indicating the synthesis of hydrophobic-hydrophilic block copolymers containing either PDADMAC or PDApipCl or other diallylammonium polymers. Different alkyl groups can be attached to the diallylammonium to provide a large variety of monomers with different properties.

Disulfides have been shown to have high chain transfer constants thereby limiting the molecular weight in various radical polymerizations, and free radical polymerizations in the presence of disulfides have been shown to produce α,ω-functionalized telomers. Aryl disulfides have also been used as iniferter (initiator-transfer-terminator) for vinyl polymerizations, thereby eliminating the need for an additional source of radical initiators. Ultimately, the use of disulfides as iniferter eliminates end groups resulting from any additional radical initiator and can cleanly produce difunctional telechelic oligomers.

Multiblock is a type of polymer architecture that can combine the properties of two different materials into one unique copolymer system. Alternating hydrophobic-hydrophilic multiblock architecture has been employed in designing both anion and proton exchange membranes. Multiblock copolymers can be derived from either the reaction between two different complementarily functionalized telechelic prepolymers or the presence of an appropriately functionalized telomer in a polymerization reaction with comonomers. The synthesis of multiblock copolymers is a technique to prepare materials capable of microphase separation, and the production of multiblock copolymer materials designed for anion exchange membranes can improve ionic conductivity and dimensional stability compared to random copolymer analogues.

The present invention relates to a series of hydrophobic-hydrophilic multiblock copolymer membranes with the general structure illustrated in FIG. 1A, incorporating a polydiallyammonium block combined with hydrophobic polymer blocks. In FIG. 1A, R is an alkyl group or cyclic through linking of the two R groups as drawn A– anion. The linking group between the hydrophobic polymer and the diallylammonium polymer repeated structure represents the multiblock copolymer. An example is provided in FIG. 1B with polysulfone (PSf) as the hydrophobic polymer block and poly(diallylpiperidinium) (PDApip) segments. The counterion to the cationic ammonium group in the poly(diallylammonium) can be a variety of counterions including the halogens, hydroxide, carbonate, bicarbonate, hexafluorophosphate, tetrafluoroborate, aryl- and alkyl-sulfonates, and others. The counterion can impart solubility preferences to the polydiallyammonium polymer and to the resulting multiblock copolymers. Employing a functionalized disulfide in the radical polymerization of the diallylammonium monomer can result in effective di-functionalization of the diallylammonium polymer on the chain ends ($\alpha,\omega$-functionalization). Employing differently functionalized disulfides provides for the preparation of a variety of polydiallyammonium polymers with functional groups on the chain ends that can participate in copolymerization with other monomers that can provide for the preparation of multiblock copolymers that are synthesized in-situ. Using the difunctional poly(diallylammonium) with appropriate monomers with which it can react provides a method in which multiblock poly(diallylammonium) can be prepared with polyether like polysulfones and polyketones, polyesters, polyamides, as well as other types of polymers. As a variation of the method, preformed $\alpha,\omega$-difunctional hydrophobic polymers can be reacted with the complementarily $\alpha,\omega$-functionalized polydiallyammonium polymers in order to produce the multiblock copolymers.

4-(fluorophenyl) disulfide can be employed as a photoiniferter with PDApipCl as the diallylammonium monomer and produce $\alpha,\omega$-4-fluorophenyl sulfide functionalized PDApipCl. Oxidation of the 4-fluorophenyl sulfide end groups to 4-fluorophenyl sulfone sufficiently activated the telomers, or difunctional polymer, for nucleophilic aromatic substitution in the preparation of a polysulfone multiblock copolymer. Ion exchange of the chloride counterion to hexafluorophosphate enabled solubility of the cationic prepolymers in polar aprotic solvents like N,N-dimethylacetamide (DMAc) (dimethylacetamide), and multiblock copolymers were then produced by nucleophilic aromatic substitution under typical polysulfone synthesis conditions.

The present method of the invention allows for tuning of the ion exchange capacity by varying the weight percent of the poly(diallylammonium) through changes in the molecular weight of the difunctional polydiallyammonium polymer. The final multiblock copolymers can be fabricated into membranes by melt and solution processes, and ion exchanged reversibly to other anion counteriors such as halides, hydroxide, carbonates and bicarbonates. Properties of the copolymer and membranes containing the copolymer are equivalent or better compared to other membranes. The properties include ionic transport such as hydroxide conductivity, water uptake, phase separation of the block copolymers, mechanical properties, and base and thermal stability. The products envisioned are membranes for use in separations, for use in alkaline fuel cells, water purification, electrolysis, flow batteries, and anti-bacterial membranes and materials, as well as membrane electrode assemblies for fuel cells.

The materials described in the present invention are highly stable under basic conditions at elevated temperatures and under a variety of humidity conditions. Traditionally, membranes containing the poly(diallylammonium) group have not been utilized because of the difficulty in preparing copolymers with hydrophobic monomers. The present invention is a way to make end-functionalized ($\alpha,\omega$-telechelic) poly(diallylammonium) polymers and more specifically, poly(diallylpiperidinium) polymers with the end group incorporation resulting in new compositions of matter; a way to incorporate those poly(diallylammonium) polymers into (multi)block copolymers with hydrophobic monomers to result in polymer membrane films with new compositions of matter that are not water soluble; the use of the materials in applications that require high chemical stability to a basic environment; and the application of the materials for ion and water transport. The present invention provides a method to incorporate the poly(diallylammonium) polymers into membranes and produce highly base stable cationic polymers (the poly(diallylpiperidinium) polymers) for use in membrane applications. The advantages are potentially low cost and high alkaline stability over existing materials.

An aspect of the invention is a method of forming a poly(diallylammonium) multiblock copolymer. The method includes mixing a diallylammonium polymer functionalized on a first end with a first group and functionalized on a second end, a first difunctional monomer functionalized with a second group and a second difunctional monomer functionalized with a third group form a first mixture. The first mixture is reacted to for the poly(diallylammonium) multiblock copolymer.

An aspect of the invention is a poly(diallylammonium) multiblock copolymer. Another aspect of the invention is a membrane comprising a poly(diallyl ammonium) multiblock copolymer.

DETAILED DESCRIPTION

Figure 1A:
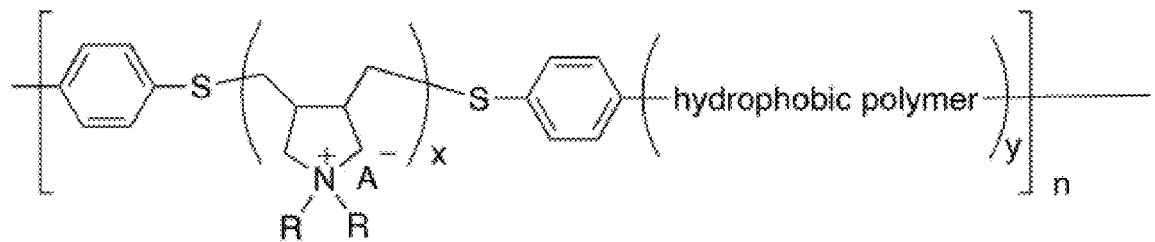
FIG. 1A illustrates a hydrophobic-hydrophilic multiblock copolymer of the present invention.
Figure 1B:
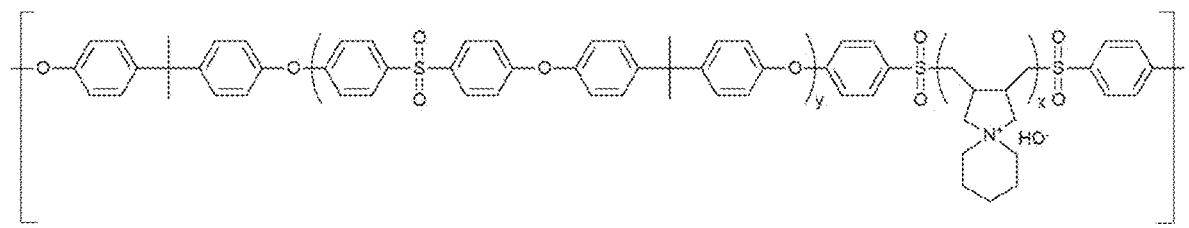
FIG. 1B illustrates a polysulfone (PSf) as the hydrophobic polymer block and poly(diallylpiperidinium) (PDApip) segments illustrates a hydrophobic-hydrophilic multiblock copolymer of the present invention.

The present invention relates to a diallylammonium monomer that can be chained and functionalized on both chain ends, then incorporated into copolymer with a hydrophobic component resulting in a multiblock copolymer, the multiblock copolymer and methods of using the multiblock copolymer. The functionalized ends can be the same or different, and can be used with a diallyl ammonium monomer to form a polymer. An advantage of the present invention is that the method can form several diallylammonium multiblock copolymers, including polysulfones, polyesters, polyketones, polyamides, or other hydrophobic group containing polymers. The resulting polymer, which is also an aspect of the invention, can be incorporated into several materials or can be used in a variety of applications, for example, membranes or coatings (which is another aspect of the invention).

The method of forming the diallylammonium polymer can depend on the end polymer. For example, the processing steps and the difunctional-monomers used to form the polymer will depend on the end polymer. As the present invention can be used to form a variety of polymers, Applicant provides examples of methods to form several polymers, and the method can be applied by one skilled in the art to form other polymers.

The molecular weight of the diallylammonium polymer is one variable that can be controlled by the method. By controlling the molecular weight of the diallylammonium polymer, variation in the composition of the end block copolymer can be accomplished to provide a variability in the hydrophilic-hydrophobic balance and the ionic content.

The resulting polymer is positively charged and therefore can further comprise an anion. The anion can be $PF_6^-$, $Cl^-$, $OH^-$, $BF_4^-$, tosylates, aryl sulfonates, alkyl sulfonates, carbonates, bicarbonates, fluoride, bromide, or iodide. The anion can alter the properties of the polymer. The anion of the polymer can be altered by soaking the polymer in solutions comprising the anion. In some embodiments, the anion can be selected so that the polymer is soluble in hydrophobic solvents or solutions. In some embodiments, absent particular anions, the polymer is not soluble in the non-aqueous solvents, for example hydrophobic solvent or solutions, but can instead be soluble in aqueous solutions. Examples of such anions that allow the polymer to be soluble in non-aqueous solvents includes, for example, $PF_6^-$, $BF_4^-$, tosylates, aryl sulfonates, or alkyl sulfonates.

An aspect of the invention is the synthesis of 4-fluorophenyl sulfide terminated poly(N,N-diallylpiperidinium halogen) (PDApipHal). The method includes mixing a monomer solution comprising N,N-diallylpiperidinium halogen (DApipHal) and a disulfide to produce a first solution. The first solution is purged with an inert gas to produce a first solution. The first solution is then heated to a temperature between about 30° C. and about 90° C. to produce a heated solution. A UV light is provided to the heated solution to polymerize the heated solution and form the PDApipHal.

The disulfide can be a bis(4-fluorophenyl) disulfide, a bis(4-chlorophenyl) disulfide and combinations thereof. The disulfide can be in a water:alcohol mixture. The alcohol can be methanol, ethanol, isopropanol or combinations thereof. The ratio of the water to alcohol can be between about 100 and about 10, in some embodiments about 1:1. The ratio of the DApipHal and the disulfide can be between about 1:1 and about 1:130, in some embodiments between about 1:75 and about 1:125, in some embodiments about 1:75, about 1:100 or about 1:125. Altering the ratio of the DPApipHal to the disulfide can alter the final molecular weight of the PDApipHal. Furthermore, altering the amount of PDApip in the copolymer can alter the hydroxide conductivity of the copolymer. The concentration of the monomer solution can be between about 1M and about 3.5M, in some embodiments about 2.5M. The halogen can be chlorine, bromine, or iodine.

The first solution can be purged with an inert gas. The gas can be nitrogen, argon, helium, or combinations thereof. The first solution can be heated to a temperature between about 30° C. and about 90° C., in some embodiments about 60° C. The UV light can be provided before the first solution is heated to the temperature between about 30° C. and about 90° C. For example, the UV light can be provided after between about 5 minutes and about 30 minutes, or when the temperature is between about between about 0° C. and about 30° C.

The PDApipHal can be precipitated after the heated solution is polymerized. The PDApipHal can be precipitated with a hydrocarbon, such as acetone, ether, or combinations thereof. In some embodiments, the PDApipHal can be dissolved in an alcohol. The alcohol can be methanol, ethanol, isopropanol or combinations thereof. Purified PDApipHal can be precipitated from the alcohol/PDApipHal mixture. The PDApipHal (purified or not purified) can be dried. The drying can occur at a temperature between about 25° C. and about 150° C. In some embodiments, the drying can occur in vacuum, at a pressure of between about 2 torr and about 100 millitorr, at a temperature between about 100° C. and about 25° C.

An aspect of the invention is a method to oxidize 4-fluorophenyl sulfide terminated (PDApipHal). The method includes mixing 4-fluorophenyl sulfide terminated (PDApipHal) and water to produce a first solution. The first solution is mixed with an oxidant like oxone, which is potassium peroxymonosulfate, to produce a homogenous mixture. The homogenous mixture is heated to a temperature between about 30° C. and 90° C., which is then concentrated to produce a mixture comprising a precipitate. The precipitate, which is an oxidized PDApipHal, is separated from the solute.

Figure 2:
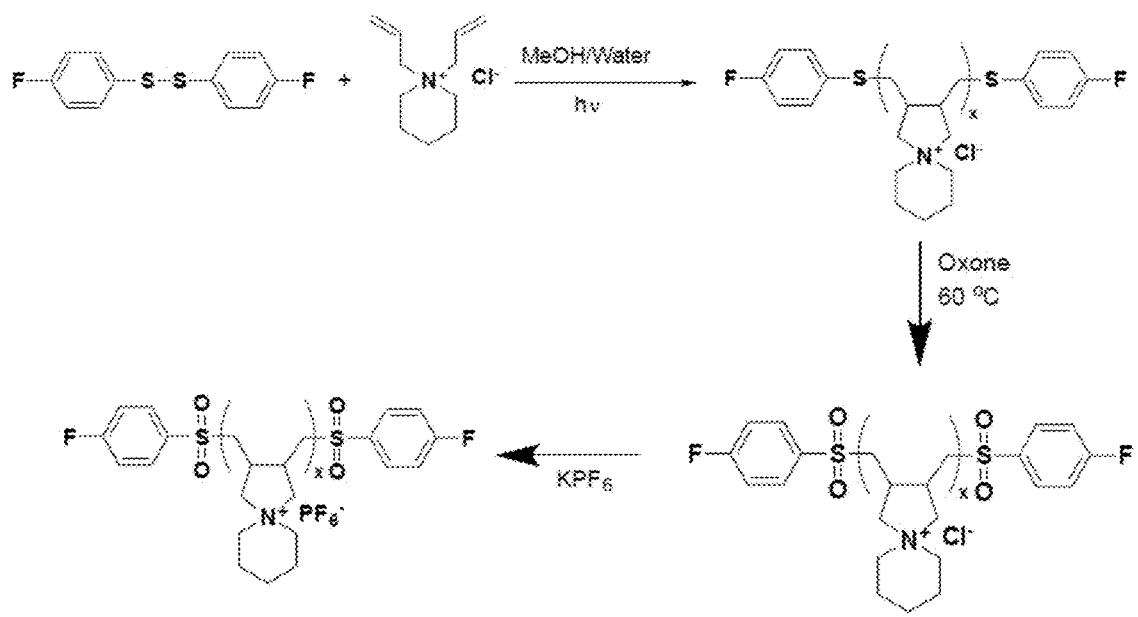
FIG. 2 illustrates an embodiment of synthesizing a functionalized diallylammonium polymer from a N, N-diallylpiperdine and a disulfide.

The oxidant can be oxone, peroxide, hydroperoxide, oxygen or combinations thereof. The water can be tap water, distilled water or deionized water. The PDApipHal and water are mixed until the PDApipHal dissolves in the water. The first solution and the oxone can be mixed until a homogenous mixture forms. The homogenous mixture is heated to between about 30° C. and about 90° C., in some embodiments about 60° C. The homogenous mixture can be heated for between about 30 minutes and about 48 hours, in some embodiments between about 10 hours and about 16 hours. The homogenous mixture can be concentrated using an evaporator, for example rotary evaporation. In some embodiments, the precipitate can be precipitated with a solvent, for example acetone, ether, or combinations thereof. After the precipitate is separated, which can occur by filtration, decanting, or combinations thereof, the precipitate can be dissolved in water, which can be precipitated into a saturated solution of aqueous potassium hexafluorophosphate to form the 4-fluorophenyl sulfone terminated diallylammonium polymer with a hexafluorophosphate anion (PDApipPF6). The 4-fluorophenyl sulfone terminated PDApipPF6 can be washed with water and dried. Drying can occur at an elevated temperature (e.g. between about 30° C. and about 150° C.) or under vacuum at a pressure of between about 2 torr and about 100 millitorr, and a temperature between about 100° C. and about 25° C. FIG. 2 illustrates an embodiment of synthesizing a functionalized diallylammonium polymer from a N, N-diallylpiperdine and a disulfide.

An aspect of the invention is a method to form a poly (diallylammonium) multiblock copolymer. In general, a diallylammonium monomer is polymerized with a iniferter. The iniferter is a functionalized di-monomer component, for example a disulfide. As explained above, the iniferter component can be selected based on the end product. The iniferter can be used as a photoinitiator, chain transfer agent and a chain terminator. The polymerized diallylammonium is thereafter functionalized and can be combined with additional first and second difunctional monomer components, which can copolymerize with the functionalized poly(diallylammonium) to form a hydrophobic block resulting in a multiblock copolymer of high molecular weight (i.e. greater than about 20,000 g/mole MW). The first and second difunctional monomer components can also be selected based on the end product. For example, the first difunctional monomer can be a halophenyl sulfone and the second difunctional-monomer can be a bisphenol. Both the iniferter and first di-functional-monomer components can include the same functional groups, different functionalized groups, or multiple functionalized groups (i.e. the iniferter can comprise two different functional groups and the first difunctional monomer can include two different functional groups, where the functional groups of the iniferter and the first difunctional monomer can be the same or different). In some embodiments, the functional group of the diallylammonium polymer can be the same as a functional group on the first difunctional monomer. The functional group can be a halophenyl, a carboxylic acid, carboxylic acid chloride, an amine, an acid chloride, an alcohol, a phenol, an alkyl, an alkyl halide and combinations thereof. The diallylmonomer can be a diallyldimethyl, a diallyldiethyl, a diallyldipropyl, a diallyldibutyl, a diallyldipentyl, a diallyldihexyl, a cyclic diallyl, including a diallylpiperidinium, a diallylpyrrolidinium.

The functional groups of the iniferter, first or the second difunctional monomers can be the same or different. In some embodiments the functional groups of the iniferter, first or second difunctional monomers can be a bisphenol, a di-alcohol, an alkyl dihalide, an aryl dihalide, a diamine, a dicarboxylic acid, a dicarboxylic acid chloride. The monomers can be used to form the polyester, polyether, polysufone, polyketone, or polyamides, for example. Other polymers can be formed as one skilled in the art would understand based on the invention.

The ratio of the diallylammonium monomer to the iniferter can alter the molecular weight of the diallylammonium polymer. Thus, the ratio of the diallylammonium monomer to the iniferter can vary based on the end product. In some embodiments, the ratio of the diallylammonium monomer to the iniferter can be between about 10:1 and about 300:1. In some embodiments, the ratio of the functionalized diallylammonium polymer to the functionalized first and second difunctional monomers should be such that the total number of first functional groups is roughly equal to the number of second functional groups. By altering the molecular weight of the diallylammonium polymer, the composition of the end multiblock copolymer can be varied. The weight fraction of the diallylammonium polymer in the multiblock copolymer can be between about 0.1 and about 0.8.

In some embodiments, rather than forming a second polymer in-situ from the reaction of the first and second difunctional monomers, a functionalized polymer can be prepared by first reacting first and second monomers with an excess of second monomer to result in α,ω-functionalized polymer and then reacting the resulting second polymer with the diallylammonium polymer prepared from the iniferter with first functional groups to prepare the poly(diallyl ammonium) multiblock copolymer. The ratio of the diallylammonium polymer functional groups:second polymer functional groups is approximately 1:1 and the ratio of diallylammonium polymer to second polymer is between 1:10 and 8:2 with the molecular weight of the diallylammonium polymer controlled by the ratio of diallylammonium to iniferter.

To illustrate the invention, the formation of a polysulfone-PDApipPF6 can be discussed. A bisphenol, an inorganic carbonate, a polar aprotic organic solvent, and a hydrocarbon solvent are combined to form a mixture. The first mixture can be heated in an inert environment at a temperature between about 100° C. and about 200° C. for between about 1.5 hours and about 4 hours to form a heated first mixture. The PDApipCl and bis(4-fluorophenyl) sulfone are added to the mixture in ratios that result in a 1:1 ratio of first and second functional groups. The solution is heated to a temperature between about 100° C. and about 180° C. for between about 30 minutes and about 24 hours. The heated first mixture can be cooled to a temperature between about 15° C. and about 35° C. forming a cooled first mixture. The cooled solution can be diluted with solvent such as DMAc (ratio of between about 2:1 and 1:10 of the solution to the DMAc). The diluted mixture can be precipitated with an alcohol, which can then be separated. The polysulfone-PDApipPF6 multiblock copolymer is the precipitate.

The molecular weight of the multiblock copolymer can be adjusted by varying the length of the 4-fluorophenyl sulfone terminated PDApipPF$_6$ oligomers. The bisphenol can be bisphenol A, biphenol, hydroquinone, bis-hydroxyphenylmethane, hydroxyphenylether or combinations thereof. The carbonate can be a potassium carbonate, sodium carbonate, cesium carbonate or combinations thereof. The polar aprotic solvent can be dimethylacetamide, n-methylpyrollidinone, dimethylsulfoxide, sulfolane, dimethylpropyurea, dimethylformamide or combinations thereof. Polar aprotic solvents can be used both in the initial mixture and to dilute the refluxed mixture, and the dilution solvent can be the same or different. The hydrocarbon can be toluene, hexane, benzene, cyclohexane or combinations thereof. The alcohol can be methanol, ethanol, isopropanol or combinations thereof.

The inert gas used to make the inert environment can be nitrogen gas, argon gas, helium gas, and combinations thereof. The temperature can be between about 100° C. and about 200° C., in some embodiments between about 120° C. and about 180° C., in some embodiments about 150° C., about 160° C., or about 175° C. The time period can be between about 1.5 hours and about 4 hours. In some embodiments, the time period can be about 3 hours. The heated first mixture can be cooled to a temperature between about 15° C. and about 35° C., in some embodiments about room temperature (approximately 22-27° C.), to form the cooled first mixture. The cooled first mixture can be refluxed for between about 1.5 hours and about 5 hours, in some embodiments between about 2 hours and 4 hours, in some embodiments about 3 hours.

The precipitate is separated from the solution, which can occur by filtration, decanting, or combinations thereof. In some embodiments, residual salts can be removed from the precipitate by rinsing the precipitate with an aqueous solution, which can be water (distilled, deionized, tap, or combinations thereof), alcohol (for example, methanol, ethanol, isopropanol, or combinations thereof) or combinations thereof.

Figure 3:
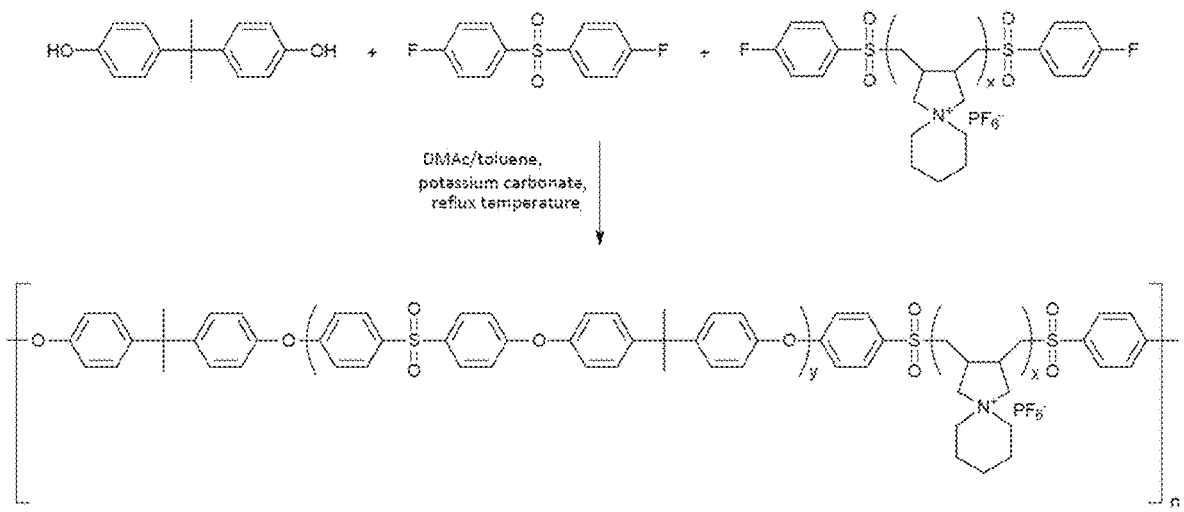
FIG. 3 illustrates an embodiment of the synthesis of PSf-PDApipPF6 multiblock copolymers of the present invention.
Figure 4:
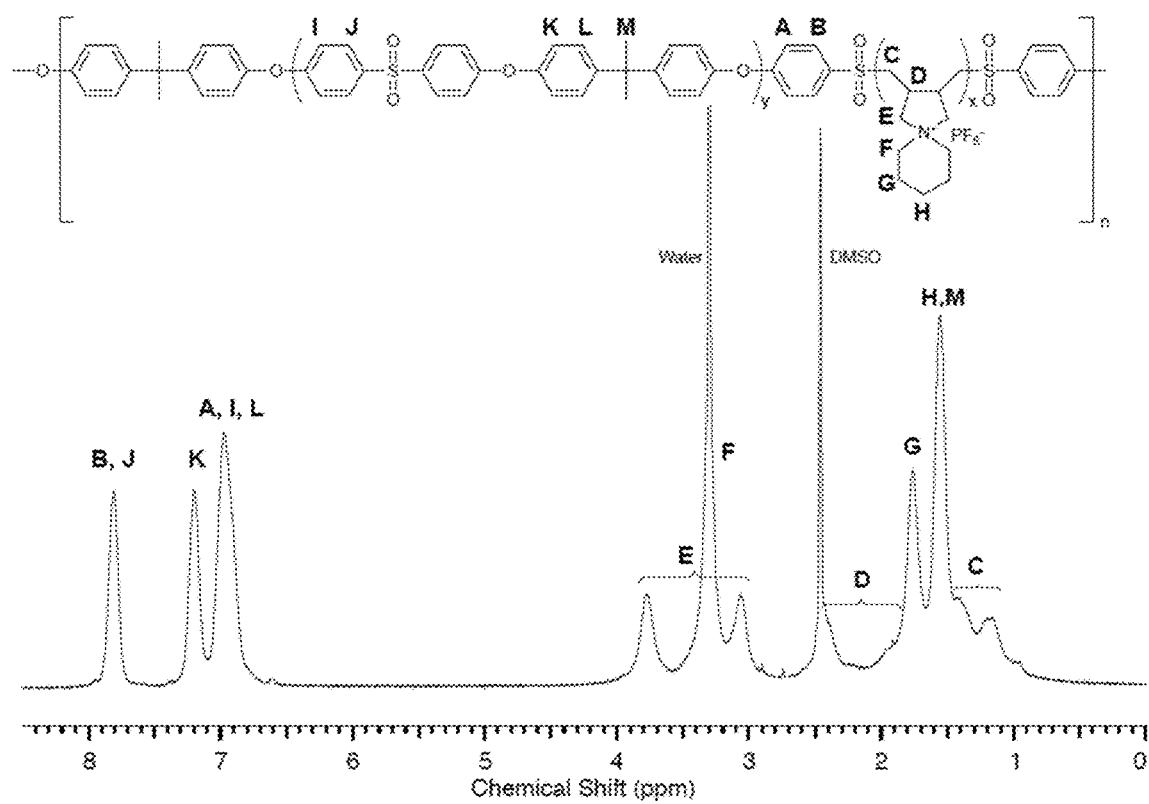
FIG. 4 illustrates a $^1$H NMR spectrum on a PSf-PDApipPF6 multiblock copolymer of the present invention.

In some embodiments, the precipitate can be dried at room temperature, under vacuum at a pressure between about 2 torr and about 100 millitorr, and a temperature between about 20° C. and about 100° C., in some embodiments about 80° C. The precipitate can also be dried at an elevated temperature between about 30° C. and about 150° C. The precipitate can include between about 16 wt. % and about 40 wt. % of poly(diallylpiperidinium). FIG. 3 illustrates an embodiment of the synthesis of PSf-PDApipPF6 multiblock copolymers of the present invention. A $^1$H NMR spectrum on a PSf-PDApipPF6 multiblock copolymer of the present invention is illustrated in FIG. 4.

The synthesis of N,N-diallylpiperidinium chloride (DApipCl), as described in B.-H. Tian, B. Fan, X.-J. Peng and Z.-K. Luan, A cleaner two-step synthesis of high purity diallyldimethylammonium chloride monomers for flocculant preparation, *J. Environ. Sci.*, 2005, 17, 798-801, which is incorporated by reference in its entirety. The synthesis of bis(4-fluorophenyl) disulfide described in Y. Z. Meng, A. R. Hlil and A. S. Hay, Synthesis of macrocyclic aliphatic disulfide oligomers from dithiols by oxidative coupling with oxygen using a copper-amine catalyst, *Polym. Adv. Technol.*, 2004, 15, 564-566, which is incorporated by reference in its entirety. The oxidation of 4-fluorothioanisole to 4-fluorophenylmethyl sulfone described in K. S. Webb, A mild, inexpensive and practical oxidation of sulfides, *Tetrahedron Lett.*, 1994, 35, 3457-3460, which is incorporated by reference in its entirety.

An aspect of the invention is a method to form a membrane comprising a poly(diallyl ammonium) multiblock copolymer. The method includes casting the poly(diallyl ammonium) multiblock copolymer to a substrate to produce a supported membrane. The supported membrane is heated, and the membrane is removed from the substrate to produce a free standing membrane. In some embodiments the membrane can remain on the support. The substrate can be glass, metal, or a polymer.

The poly(diallylammonium) multiblock copolymer can be in a solvent, which can be DMAc, DMF, DMSO, DMPU, NMP, or combinations thereof. Between about 5% w/v and about 30% w/v of the poly(diallylammonium) multiblock copolymer is in the solvent.

In some embodiments, the poly(diallyl ammonium) multiblock copolymer in the solvent can be filtered prior to casting. The filter can be a plug of glass wool, syringe filters, or multiple filtering techniques can be used.

Solvents for the poly(diallyl ammonium) multiblock copolymer can be driven from the membrane by heating the membrane to a temperature between about 25° C. and about 90° C., in some embodiments, between about 60° C. and about 90° C.

The free-standing membrane can be dried. In some embodiments the free-standing membrane can be dried at room temperature, at a temperature between about 30° C. and about 150° C., or under vacuum at a temperature between about 20° C. and about 100° C., and a pressure of between about 2 torr and about 100 millitorr. A combination of drying methods can be used.

In some embodiments, the free-standing membrane with the poly(diallylammonium) multiblock copolymer can be immersed in a salt solution. The salt solution can be a salt of chloride, bromide, iodide, fluoride, hydroxide, carbonate, bicarbonate, alky sulfonate, aryl sulfonate. The concentration of the salt solution can be between about 0.01M and about 5M. The salt solution can convert the poly(diallyl ammonium) multiblock copolymer to poly(diallyl ammonium)-anion. The poly(diallyl ammonium)-anion can be heated to a temperature between about 30° C. and about 150° C., for between about 30 minutes and about 96 hours, in some embodiments about 48 hours. The heated poly (diallyl ammonium)-anion membrane can be immersed in a hydroxide solution. The hydroxide solution can include potassium hydroxide, sodium hydroxide, ammonium hydroxide. The concentration of the hydroxide concentration can be between about 0.1 M and about 10 M, in some embodiments about 2 M. The poly(diallyl ammonium)-anion membrane can be converted to poly(diallyl ammonium)-hydroxide membrane.

The poly(diallyl ammonium)-hydroxide membrane can be washed with an aqueous solution to produce a neutral poly(diallyl ammonium)-hydroxide membrane. The aqueous solution can be water (tap, distilled, deionized), or combinations thereof. The poly(diallyl ammonium)-hydroxide membrane can be dried with a gas. The gas can be air, nitrogen, argon, helium, oxygen, or combinations thereof. In some embodiments, the poly(diallyl ammonium)-hydroxide membrane can be washed then dried, which can be repeated between 1 and about 20 times.

An aspect of the invention is a poly(diallyl ammonium) multiblock copolymer. The copolymer can be used to form a membrane. The copolymer can include between about 10 wt. % and about 70 wt. % of the poly(diallyl ammonium)

with the balance being the polymer resulting from the polymerization of the first and second difunctional-monomers. In some embodiments, incidental materials, for example inorganic compounds like silica, titania, inorganic carbonates can be included in the copolymer in an amount between about 0 wt. % and about 20 wt. %.

An aspect of the invention is a membrane (or coating), which includes a poly(diallyl ammonium) multiblock copolymer. The ion exchange capacity of the membrane can be between about 0.3 and about 3. The hydroxide conductivity of the membrane can be between about 0.005 mS and about 200 mS at room temperature, in some embodiments about 80 mS. The activation energy of the membrane can be between about 5 kJ/mol and about 20 kJ/mol, in some embodiments between about 9 kJ/mol and about 12 kJ/mol. The percentage water uptake of the membrane can be between about 10 weight percent and about 40 weight percent at room temperature, in some embodiments between about 14 weight percent and about 36 weight percent at room temperature. The membrane can be transparent and colorless.

An aspect of the invention is a device comprising the poly(diallyl ammonium) multiblock copolymer. The device can be a fuel cell, a water purifier, alkaline fuel cell, an electrolyzer, a battery. The device can be used for energy supply, water purification, electrolysis, ion separation gas separation.

EXAMPLES

Materials

Allyl chloride (98%) was purchased from Alfa Aesar and was distilled under nitrogen prior to use. Bisphenol A (97%) and bis(4-fluorophenyl) sulfone (99%) were obtained from Sigma-Aldrich and were twice crystallized from toluene. N,N dimethylacetamide (DMAc) (99.9%) was purchased from Sigma-Aldrich and distilled from phosphorous pentoxide prior to use. Piperidine (99%), allyl bromide (99%), 4-fluorothiophenol (98%), N,N,N,N-tetramethylethylenediamine (TMEDA) (99%), and potassium peroxymonosulfate (Oxone) were obtained from Sigma-Aldrich and were used as received. Acetonitrile-d3, DMSO-d6, and deuterium oxide were obtained from Sigma-Aldrich. CDCl3 was purchased from Cambridge Isotope Laboratories. All other chemicals and solvents were used as received from commercial sources.

Example 1: Synthesis of N-Allylpiperidine

N-allylpiperidine was obtained by condensing piperidine with allyl bromide. A 250 mL round bottom flask, equipped with a magnetic stir bar and an addition funnel, was charged with sodium hydroxide (14.5 g, 0.36 mol) and water (20 mL). The mixture was stirred at 0° C. until all the sodium hydroxide was dissolved. Piperidine (30 mL, 0.30 mol) was then added to the aqueous solution and the addition funnel was charged with allyl bromide (26.3 mL, 0.30 mol). Allyl bromide was slowly added to the ice cold solution over a period of 30 minutes and then allowed to warm to room temperature for an additional 1.5 hours. The resulting oil layer was separated, and the aqueous layer was extracted once with chloroform and combined with the oil. The chloroform was evaporated and the product distilled, from sodium hydroxide, at room temperature under 100 mtorr vacuum producing a colorless liquid (35.6 g, 93.7% yield). 1H NMR (500 MHz, CDCl3): δ 5.89 (1H, ddt, 17.0 Hz, 10.3 Hz, 6.6 Hz), 5.16 (1H, d, 17.0 Hz), 5.12 (1H, d, 10.3 Hz), 2.96 (2H, d, 6.6 Hz), 2.37 (4H, bS), 1.59 (4H, quin, 5.3 Hz), 1.42 (2H, bt, 5.3 Hz).

Synthesis of N,N-Diallylpiperidinium Chloride (DApipCl)

The synthesis of N,N-diallylpiperidinium chloride was accomplished by the nucleophilic substitution of N-allylpiperidine with allyl chloride as discussed in Tian, which has been incorporated by reference in its entirety.

Briefly, a 250 mL round bottom flask equipped with a magnetic stir bar was charged with N-allylpiperidine (35.6 g, 0.284 mol), allyl chloride (29.0 mL, 0.356 mol), and water (55 mL). The flask was sealed with a rubber septum that was secured with copper wire. The two-phase reaction was stirred vigorously at 65° C. for 2 days. The resulting oil layer was separated, and the aqueous phase washed once with diethyl ether, combined with the oil layer and concentrated by rotary evaporation. Acetone (200 mL) was added to the resulting viscous oil and a white precipitate formed. The white solid was collected by filtration and dried under vacuum at 200 mtorr (37.6 g, 66.5% yield). 1H NMR (500 MHz, D2O): δ 5.85 (2H, m), 5.45 (4H, m), 3.76 (4H, d, 10 Hz), 3.18 (4H, m), 1.74 (4H, s), 1.51 (2H, s). 13C NMR (125 MHz, D2O): δ 128.7, 124.1, 61.0, 58.4, 20.7, 19.3. HRMS (EI) for [C11H20ClN]+: calculated 201.1284, found 201.1238.

Synthesis of bis(4-fluorophenyl) disulfide

Synthesis of bis(4-fluorophenyl) disulfide was accomplished by oxidation of 4-fluorothiophenol as described in Meng et al., which has been incorporated by reference in its entirety.

Briefly, a 25 mL round bottom flask was charged with 4-fluorothiophenol (2.39 g, 0.018 mol), Cu(II)Cl (28 mg, 0.16 mmol), TMEDA (54 µL, 0.36 mmol), and THF (5 mL). Oxygen was bubbled through the reaction mixture for 1 hour and the flask was subsequently sealed with a septum under an oxygen atmosphere. The reaction was stirred overnight at room temperature, then filtered through a plug of activated alumina and the solvent removed by rotary evaporation. The resulting yellow oil was dissolved in chloroform, washed twice with aqueous KOH (10 wt. %), dried over MgSO4 and the chloroform removed by rotary evaporation. The remaining material was crystallized from methanol (1.17 g, 51.3% yield). 1H NMR (500 MHz, CDCl3): δ 7.44 (4H, dd, 8.60 Hz, 5.16 Hz) 7.01 (4H, t, 8.60 Hz). 13C NMR (125 MHz, CDCl 3): δ 163.7, 161.7, 132.3, 132.2, 131.4, 131.3, 116.5, 116.3.

Oxidation of 4-fluorothioanisole to 4-fluorophenylmethyl sulfone

Synthesis of 4-fluorophenylmethyl sulfone was adapted from a literature procedure.49 In a 15 mL round bottom flask containing a magnetic stir bar, 4-fluorothioanisole (0.210 g, 1.50 mmol) and oxone (1.36 g, 2.21 mmol) were suspended in 3 mL water. The suspension was heated at 60° C. and stirred overnight. Upon cooling, a white solid precipitated and was collected by filtration. The recovered solid was then dissolved in a minimum of hot methanol. Water was carefully added until turbid and the mixture was cooled to effect crystallization. The obtained white solid was filtered and dried (0.203 g, 79% yield) λ max(acetonitrile)/nm 216

(ε/dm3 mol−1 cm−1 7800) 1H NMR (500 MHz, CDCl3): δ 7.96 (2H, m), 7.24 (2H, m), 3.05 (3H, s).

Synthesis of 4-fluorophenyl sulfide terminated poly(N,N-diallylpiperidinium chloride) (PDApipCl)

The synthesis of telechelic PDApipCl oligomers was designed to produce materials of relatively low molecular weight bearing 4-fluorophenyl sulfide end groups. A typical synthesis was as follows: DApipCl (12.6 g, 62.5 mmol) was taken up in a 1:1 solution of water and methanol and diluted to 25 mL in a volumetric flask, producing a 2.5 M stock monomer solution. A 10 mL test tube with a magnetic stir bar was charged with bis(4-fluorophenyl) disulfide (50.8 mg, 0.20 mmol) and DApipCl (4.03 g, 20 mmol, 8.0 mL of stock solution). The test tube was septum sealed and the suspension was purged with nitrogen in an ice bath for 30 min. The reaction tube was placed in a stainless steel beaker containing silicon oil maintained at 60° C. on a hot plate. The lid for the beaker was designed such that a UV pen light (254 nm) would sit in the middle of the beaker with the reaction tube approximately 2 cm away. The reaction was allowed to warm for 10 minutes and then the UV light was turned on. The polymerization was carried out for 24 hours with constant UV radiation. The viscous solution was then precipitated into acetone and the resulting white solid was collected, dissolved in methanol and precipitated into acetone again. The final white powder was collected by vacuum filtration, washed with acetone, and dried at 80° C. under vacuum (1.91 g, 47% yield) 1H NMR (500 MHz, D2O): δ 7.44 (4H, m), 7.08 (4H, m), 3.84 (2H, bs), 3.32 (4H, m), 3.10 (2H, bs), 2.53 (2H, bs), 2.10 (2H, bs), 1.79 (4H, bs), 1.57 (2H, bs), 1.47 (2H, bs), 1.23 (2H, bs). 13C NMR (125 MHz, D2O): δ 68.3, 67.0, 63.9, 63.4, 60.3, 42.3, 37.8, 29.5, 26.2, 21.6, 21.2, 20.7.

Oxidation of 4-fluorophenyl Sulfide Terminated (PDApipCl) and Ion Metathesis to Hexafluorophosphate 4-fluorophenyl sulfide terminated PDApipCl (2.43 g, 0.22 mmol sulfide end groups) was introduced into a 25 mL round bottom flask equipped with a magnetic stir bar and 5 mL water and stirred until dissolved. Oxone (270 mg, 0.44 mmol) was added to the solution and stirred until homogenous. The reaction mixture was heated at 60° C. overnight. The reaction mixture was concentrated by rotary evaporation and then precipitated into acetone. The white solid was dissolved in 5 mL water and precipitated into a saturated solution of aqueous potassium hexafluorophosphate. The white solid was collected by filtration and washed with copious amounts of water and dried at 80° C. under vacuum (1.96 g recovered)

Synthesis of Polysulfone-PDApipPF6 Multiblock Copolymers

The multiblock copolymers were synthesized to achieve a targeted weight percent incorporation of PDApip. The weight percent of PDApip incorporated was between 16 and 40% calculated in the hydroxide form. A representative procedure (sample PSf-PDApip3) is as follows: A 25 mL 3-neck round bottom flask fitted with an overhead stir motor, Dean-Stark trap prefilled with toluene, condenser and a nitrogen inlet was charged with bisphenol A (0.6527 g, 2.859 mmol), potassium carbonate (0.0593 g, 4.3 mmol), Dimethylacetamide (DMAc) (9.8 mL) and toluene (3 mL). The reaction flask was heated under nitrogen in a 150° C. oil bath to remove water to the Dean-Stark trap for 3 hours and then cooled to room temperature. Bis(4-fluorophenyl) sulfone (0.7002 g, 2.75 mmol) and 4-fluorophenyl sulfone terminated PDApipPF6 (1.100 g, 0.105 mmol end groups) were added. The reaction was then heated to reflux for 3 hours, during which time the viscosity of the reaction dramatically increased. The solution was diluted with an additional 9 mL DMAc, cooled to room temperature and precipitated into methanol. The resulting off-white fibers were collected by filtration and stirred in water overnight to remove any residual salts. The multiblock copolymer was collected by filtration, washed with methanol, and dried at 80° C. under vacuum (2.22 g, 95% yield)

Membrane Fabrication

PSf-PDApipPF6 membranes were fabricated by casting the multiblock copolymer solution onto a glass substrate. Polymer solutions were 15% w/v of copolymer in DMAc and were filtered through a plug of glass wool prior to casting. The polymer solutions were deposited onto a glass sheet and were made uniform with a doctor blade set to 75 m. The glass was heated to 75° C. on a hotplate to slowly evaporate solvent. PSf-PDApipPF6 membranes were removed from the substrate by soaking in water. The freestanding membranes were then dried under vacuum.

Ion Exchange to Hydroxide

Ion exchange to hydroxide was accomplished by first exchanging to chloride and then to hydroxide. The PSf-PDApipPF6 membranes were immersed in a saturated solution of ammonium chloride and heated in a 100° C. oil bath for 48 hours. Following ion exchange to chloride, PSf-PDApipCl membranes were then immersed in 2 M potassium hydroxide for 48 hours to complete the ion exchange to hydroxide. The resulting membranes were washed with successive nitrogen purged deionized water baths until a neutral pH was obtained.

Characterization and Measurements

Polymer structure and composition were determined by $^1$H NMR spectroscopy on a JEOL ECA-500 FT-NMR using CDCl3, deuterium oxide, DMSO-d6 or acetonitrile-d3 as solvent. The NMR chemical shift values (δ) were referenced using residual solvent signals.

Ultraviolet-visible (UV-vis) spectroscopy was performed with a Thermo Electron Corporation Evolution 300 PC spectrophotometer and was used for end group analysis of the PDApip oligomers. All measurements were made in quartz cuvettes between 200 and 400 nm and were referenced against pure solvents. Samples were prepared with either methanol or acetonitrile to approximately 0.1 wt % solutions. The presence of 4-fluorophenyl sulfide and 4-fluorophenyl sulfone was detected at wavelengths of 251 nm and 216 nm, respectively.

Thermogravimetric analysis (TGA) of both the PDApip homopolymer and PSf-PDApip multiblock copolymers was accomplished with a Seiko TG/DTA 320 Thermal Analyzer with a RT Instruments software upgrade. Measurements were run under a nitrogen atmosphere with a heating rate of 10° C. per minute. Samples in the hexafluorophosphate form were heated to 150° C. to drive off residual water, then cooled and measured. Samples in either the chloride or hydroxide form were heated at 60° C. for an hour, cooled and measured. Thermal transitions were measured by differential scanning calorimetry (DSC) on a TA Instruments Q20 DSC. Samples were prepared in T-zero aluminum pans and measured from 30-250° C. for 3 cycles. The heating rate was 10° C. per minute and the cooling rate was 40° C. per minute. The third heating was used to determine the glass transition temperature (Tg). The alkaline stability of the PDApipOH homopolymer was determined by adapting a previously established method.7 A 5 mL Teflon vial was charged with PDApipCl (0.101 g, 0.50 mmol), potassium hydroxide (0.115 g, 2.05 mmol) and methanol-d4 (2 mL), generating a 1 M solution in hydroxide and a 3-fold excess of base. The Teflon vial was sealed and placed in an 80° C. oil bath for 42 days. Samples were measured by $^1$H NMR spectroscopy at 0, 7, and 42 days and analyzed for the presence of degradation products.

The ion exchange capacity (IEC) of the PSf-PDApipCl multiblock copolymer membranes was determined using the Mohr titration method. Membrane samples, previously exchanged to the chloride form, were washed and dried at 80° C. for 24 hours to obtain the dry mass. A dried membrane, (0.1582 g) was then immersed in 40 mL of 1 M sodium nitrate and soaked for 24 hours. The solution was diluted to 50 mL in a volumetric flask and five 9 mL aliquots were titrated with a standardized 0.04955 M silver nitrate solution with potassium chromate as indicator. The ion exchange capacity (IEC) was determined from the equation (1):

$$IEC = \frac{\frac{V_T \times C_T}{V_A} \times V_S}{M_D} \quad (1)$$

where $V_T$ and $C_T$ represent the volume and concentration of the silver nitrate titrant, $V_A$ and $V_S$ are the volume of the aliquot and initial solution respectively, and $M_D$ is the dry mass of the membrane.

Tensile properties of PSf-PDApipCl multiblock copolymers were measured using a Mark-10 ESM1500 test stand equipped with a 250 N load cell, having a 0.1 N resolution. Each membrane was stretched at a rate of 10 mm/min. Membrane samples were cut and the dimensions measured exactly (roughly 50 m in thickness, 6 mm in width and 20 mm in length). Each membrane was allowed to equilibrate to ambient humidity for 24 hours. The humidity at the time of measurement was approximately 25%.

Tapping mode atomic force microscopy (TM-AFM) was used to observe the surface morphology of the PSf-PDApipPF6 membranes. Images were obtained from an Oxford Instruments AFM 3D utilizing 42 N/m silicon Point-probe tip (purchased from Nanoworld). PSf-PDApipPF6 multiblock copolymer solutions were made from DMAc at a 0.2% w/v concentration and drop cast onto 1 cm$^2$ silicon wafers. The silicon wafers were then dried overnight on a 75° C. hot plate. Prior to TM-AFM analysis, the PSf-PDApipPF6 coated wafers were allowed to equilibrate to ambient temperature and humidity. The amplitude set-point ratio (rsp) was set to 0.6 and the driving amplitude (AO) was set to 1 V. Height and phase images of all samples were collected under ambient humidity and temperature.

Percentage of water uptake (WU %) for the membranes was determined gravimetrically in the hydroxide form. Membranes were converted to the hydroxide form, washed to neutral pH, and dried under vacuum (~200 mtorr) for 24 hours to obtain a dry mass (MD). The membranes were then soaked in degassed 18 MΩ water under a nitrogen atmosphere at a given temperature. The hydrated membrane mass (MW) was determined by quickly wiping off surface water, obtaining the mass and re-soaking. Each membrane was measured 4 times at each temperature and the percent water uptake was determined by equation (2):

$$WU(\%) = \frac{M_W \times M_D}{M_D} \times 100$$

Electrochemical impedance spectroscopy (EIS) was used to determine the in-plane hydroxide conductivity. A Biologic VMP3 potentiostat using a 4-probe Teflon cell with platinum electrodes, immersed in degassed 18 MΩ water and measuring in a frequency range of 1 KHz to 300 Hz was used. Membranes were measured against a Nafion 117 standard to validate the data. The ionic conductivity of the membranes was determined by Equation (3):

$$\sigma = \frac{d}{W \times T \times R} \quad (3)$$

where σ is the ionic conductivity in mS/cm, d is the distance between the reference electrodes, W and T represent the width and thickness, in mm, of membrane at room temperature fully hydrated conditions and R is the measured resistance (Ω) of the membrane. The conductivity stability of the membranes at elevated temperature was also evaluated. PSf-PDApipOH membranes were immersed in a 1 M potassium hydroxide solution at 80° C. for 5 days. After immersion, the membranes were washed with degassed, 18 MΩ water repeatedly until a neutral pH was obtained and their hydroxide conductivity at 80° C. was measured.

Example 2: Synthesis of PDApipPF6 Telechelics

An aspect of the invention is a method to produce telechelic 4-fluorophenyl sulfone terminated PDApip oligomers to be further utilized in a polysulfone synthesis.

The first step was the synthesis of α,ω-4-fluorophenyl sulfide terminated PDApipCl. The UV initiated radical cyclopolymerization of DApipCl monomer in the presence of the photoiniferter bis(4-fluorophenyl) disulfide was expected to produce 4-fluorophenyl sulfide terminated polymers containing the desired spirocyclic ammonium repeat units. Polymerizations were carried out with a monomer/initiator feed ratio of 100/1 in a 1:1 methanol:water solution in order to maintain solubility of the resultant polymer and aid in solubility of the disulfide. Using bis(4-fluorophenyl) disulfide as a photoiniferter limits the initiating species to only 4-fluorophenyl thiyl radicals in the initiation and degenerative chain transfer processes. Termination in the polymerization of DADMAC, the dimethyl analogue, has been shown to terminate exclusively by combination of growing chains as a result of steric hindrance. It was assumed that the PDApipCl oligomers would terminate similarly, resulting in only 4-fluorophenyl sulfide end groups as a result of initiation, chain transfer to disulfide, and any polymer chain termination by combination.

Figure 5:
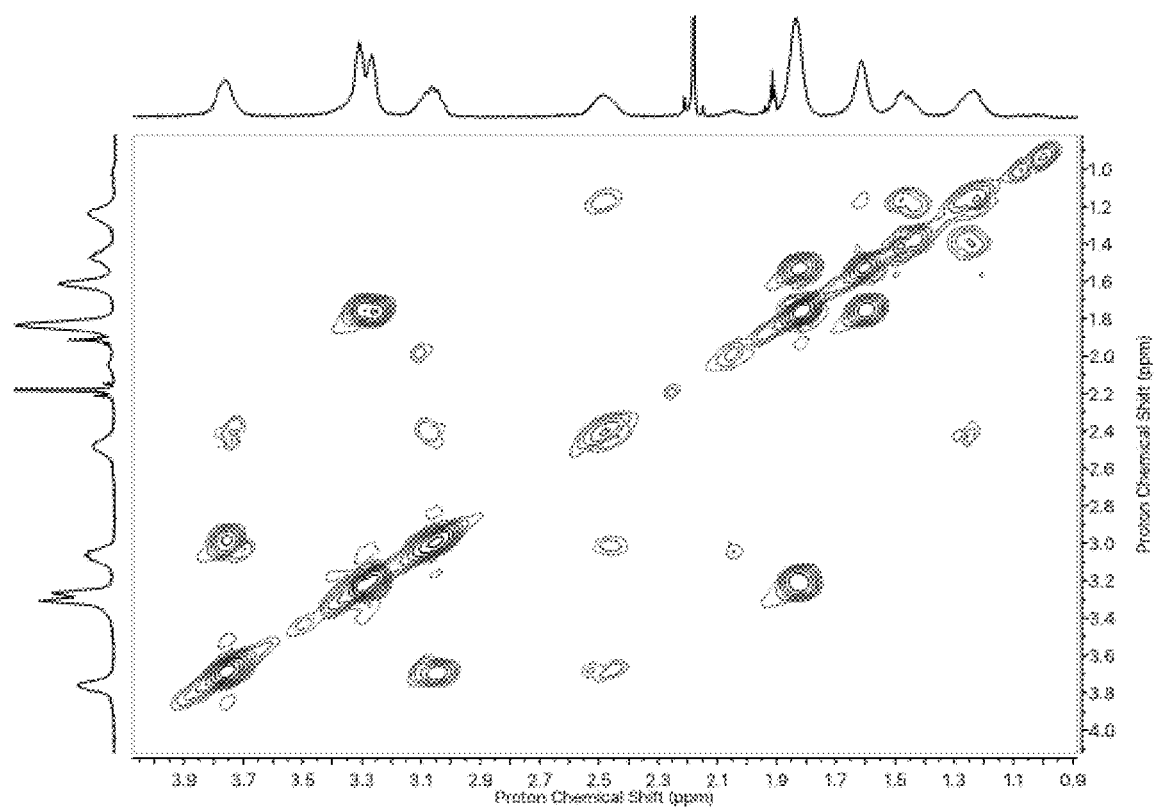
FIG. 5 illustrates a DQF-COSY NMR spectrum of PDApipPF$_6$ in acetonitrile-d$_3$.
Figure 6:
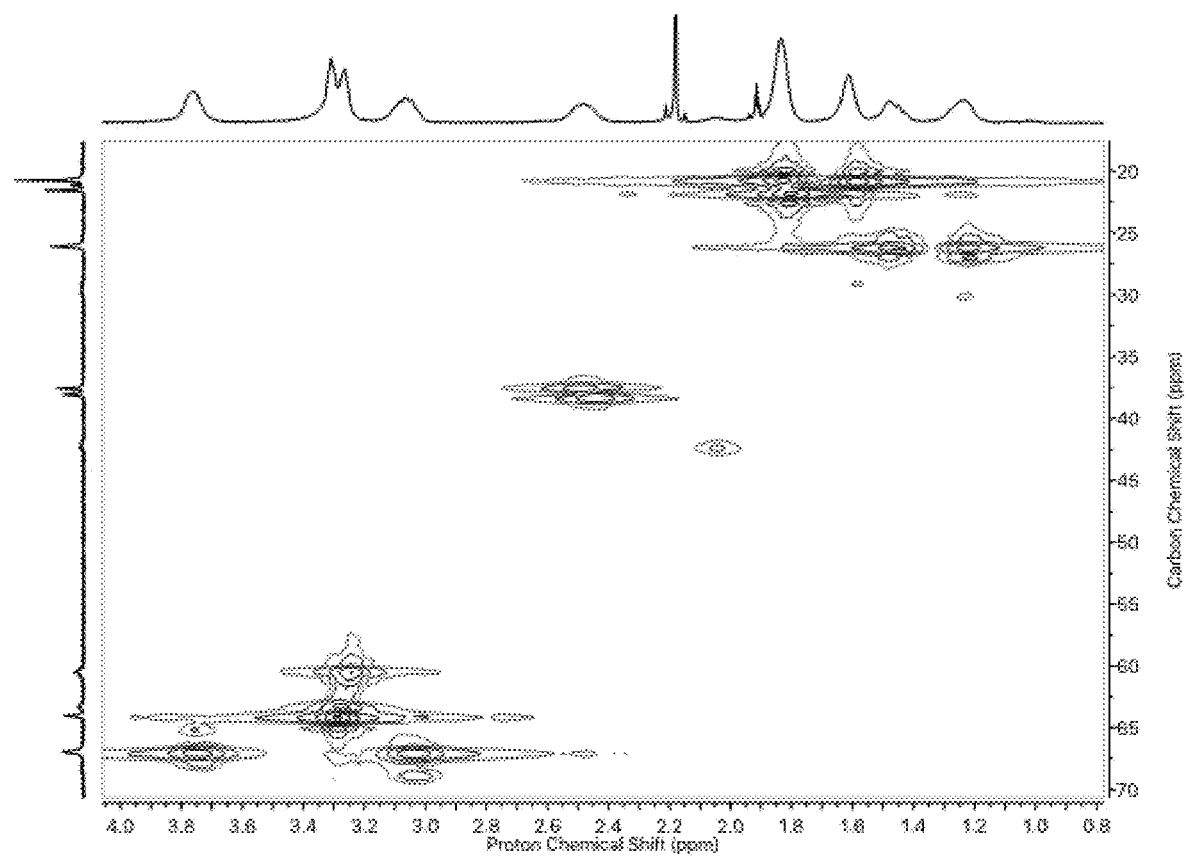
FIG. 6 illustrates a HMQC NMR spectrum of PDApipPF$_6$ in acetonitrile-d$_3$.

Nuclear magnetic resonance spectroscopy was used to elucidate the polymer structure and confirm the presence of 4-fluorophenyl sulfide end groups. The proton NMR spectrum (FIG. 4) indicates that the cyclopolymerization forms 5-membered rings as evidenced by diastereotopic protons, C and E, resulting from chiral centers, D.52 The cis-trans ratio, estimated from the D protons observed in the 1H NMR spectrum, was 6:1.52 The 4-fluorophenyl sulfide end groups were also observed downfield in the proton NMR spectrum. The peaks A and B arise from the protons ortho to the fluorine and sulfide groups, respectively. Assignments were further supported with DQF-COSY and HMQC NMR spectra (FIGS. 5 and 6). In FIG. 5, proton NMR signals were assigned from the DQF-COSY NMR Spectrum. Proton assignments for the PDApipPF$_6$ repeat unit are as follows: C protons 12 δ=1.24 & 1.48 ppm, D protons δ=2.47 & 2.05 ppm, E protons δ=3.76 & 3.07 ppm, F protons δ=3.31 & 3.27 ppm, G protons δ=1.83 ppm, H protons δ=1.61 ppm. Correlations of the D protons with both the E and C protons and correlations of G protons with both F and H protons supports the assignment. FIG. 6 illustrates a HMQC NMR spectrum of PDApipPF$_6$ in acetonitrile-d$_3$. Proton and carbon assignments were made from the HMQC NMR spectrum. C protons were assigned to carbon signals at δ=26.2 & 29.5 ppm for cis and trans. The trans carbon signal and correlation at 29.5 ppm was very weak. D protons were assigned to carbon signals at δ=37.8 & 42.3 ppm for cis and trans. E protons were assigned to carbon signals at δ=67.0 and 68.3 ppm. The trans carbon signal and proton correlation at 68.3 ppm was very weak. The assignment for protons and carbons C, D & E support the formation of the 5-member ring Due to the polymers being precipitated twice in acetone, which is a good solvent for the bis(4-fluorophenyl) disulfide, the presence of the aromatic signals clearly indicates end group functionality rather than contribution from trace amounts of disulfide starting material. The number average molecular weights (Mn) were determined from the ratio of aromatic peaks (using the integral values of the A protons, from the 4-fluorophenyl sulfide end groups) to PDApipCl repeat units (using the downfield peak at 3.84 ppm of the E protons adjacent to the nitrogen on the 5-membered ring). The resulting Mn for three separate polymerizations are provided in Table 1.

TABLE 1

| Sample  | [M] / [1] | NMR Mn (g/mol) | UV-vis Mn (g/mol) |
|---------|-----------|----------------|-------------------|
| PDApip1 | 100/1     | 14,800         | 10,200            |
| PDApip2 | 100/1     | 12,300         | 11,600            |
| PDApip3 | 100/1     | 11,000         | 12,300            |

Figure 7:
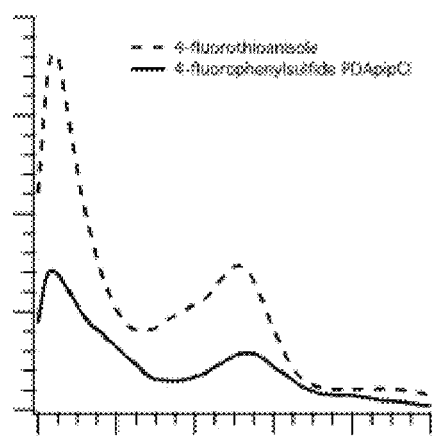
FIG. 7 illustrates a UV/vis absorbance spectrum of 4-fluorophenylsulfide terminated PDApipCl.

End group analysis and molecular weight determination was further investigated by UV-vis spectroscopy (FIG. 7). With regard to FIG. 7, the synthesis of 4-fluorothioanisole was completed using an established procedure set forth in K. F. Morgan, I. A. Hollingsworth and J. A. Bull, *Org. Biomol. Chem.*, 2015, 13, 5265-5272 (which is incorporated by reference in its entirety). The λ max(MeOH)/nm 251 (8/dm$^3$ mol$^{-1}$ cm$^{-1}$ 7500)$^1$H NMR (500 MHz, CDCl$_3$): 7.42 (2H, m), 6.99 (2H, m), 2.46 (3H, s). The concentration of 4-fluorophenyl sulfide end groups was determined from a Beer's Law calibration curve of 4-fluorothioanisole as a model for the end groups. The UV-Vis absorbance spectrum of 4-fluorothioanisole indicated two strong absorbance maxima at 204 nm and 251 nm, S3. The calibration curve was built from the absorbance at 251 nm. The 4-fluorophenylsulfide terminated PDApipCl oligomers presented similar absorbance spectra. The Mn was determined from the end group concentration in the UV-vis spectra for each polymerization and agreed well with the values determined by NMR spectroscopy, Table 1. Additionally, the concentration of 4-fluorophenyl sulfide groups present in the recovered sample was determined from the UV-vis absorbance data, and indicated the quantitative conversion of disulfide to sulfide end groups during the polymerization. The complete incorporation is a good indication of the successful degenerative transfer of the photoiniferter. The 4-fluorophenyl sulfide end groups could be used directly in a nucleophilic aromatic substitution polymerization, as sulfide groups have been demonstrated to activate aryl fluorides for reaction, however oxidation of the sulfides to the more activating sulfones was expected to improve the reactivity in nucleophilic aromatic substitution. Oxidation of the 4-fluorophenyl sulfide to 4-fluorophenyl sulfone was accomplished using Oxone, adapting a procedure that has been demonstrated for simple aromatic sulfides. The oxidized oligomers were isolated as PDApipPF6 by precipitation from a solution of potassium hexafluorophosphate. The hexafluorophosphate counterion enabled solubility in polar aprotic solvents including N-methylpyrrolidone (NMP), DMAc, dimethylsulfoxide (DMSO), 1,3-dimethyl-3,4,5,6-tetrahydro-2-pyrimidinone (DMPU), and acetonitrile. Furthermore, the PDApipPF6 oligomers became insoluble in water and methanol.

The conversion from sulfide to sulfone in the PDApipPF6 oligomers was determined by NMR spectroscopy. The 1H NMR spectrum (FIG. 4) indicated quantitative conversion with a clear downfield shift of the protons ortho to the sulfide at 7.44 ppm to 7.95 ppm for the sulfone product.

Synthesis of PSf-PDApipPF6 Multiblock Copolymers

A series of four PSf-PDApip (indicated as samples 1-4) multiblock copolymers in which the weight percentage of PDApipPF6 was varied was designed to produce high molecular weight materials and a range of IECs. Step-growth polymerization of 4-flurophenyl sulfone terminated PDApipPF6 with bis(4-fluorophenyl) sulfone and bisphenol A (FIG. 3) was completed to produce multiblock copolymers containing randomly distributed segments of PDApipPF6. The polymerization reactions were done in DMAc at reflux temperature until the solution viscosity dramatically increased. A highly viscous solution was observed after approximately 3 hours of reaction time when the reaction mixture pulled away from the reaction flask. After repeated precipitations and washing with water the final yield from each polymerization was greater than 95% with the exception of PSf-PDApip1, in which the recovered yield was only 85%.

Multiblock copolymer compositions were determined by proton NMR spectroscopy. 1H NMR spectra of the multiblock copolymers were obtained in DMSO-d6 (FIG. 4) and clearly indicate the presence of both PSf and PDApipPF6. Peaks labeled I, J, K, and L indicate the presence of the polysulfone aromatic rings and peak M, overlapped with the PDApipPF6 corresponds to the isopropylidene methyl groups on the bisphenol A portion of the polysulfone backbone. The compositions, Table 2, were determined by comparing the integration from peaks J and E, corresponding to the protons adjacent to the sulfone in the polysulfone backbone and protons adjacent to the nitrogen on the 5-membered ring in the PDApip backbone.

TABLE 2

| Sample | NMR wt. % PDApipOH | % yield | IEC [Cl$^a$] (meq/g) | IEC [Cl$^b$] (meq/g) | IEC [HO] (meq/g) |
|--------|---------------------|---------|----------------------|----------------------|------------------|
| PSf-PDApip1 | 16.2 | 85 | 0.87 | 0.89 ± 0.01 | 0.9 |
| PSf-PDApip2 | 22.3 | 91 | 1.19 | 1.25 ± 0.02 | 1.29 |
| PSf-PDApip3 | 29.0 | 96 | 1.54 | 1.49 ± 0.03 | 1.53 |
| PSf-PDApip4 | 40.2 | 93 | 2.10 | 1.95 ± 0.18 | 2.02 |

The NMR and IEC [Cl$^a$] were determined from 1H N<R spectroscopy. The IEC [Cl$^b$] was determined by titration of chloride. The IEC [HO] was calculated from the chloride titration values. The contribution of the PDApip end groups to the J peak were assumed to be negligible. The composition analysis was used to determine the IEC (for simplicity presented as values calculated in either the chloride form or hydroxide form). The IECs were found to range from 0.9-2.02 meq/g when calculated in the hydroxide form.

Membrane Fabrication and Mechanical Properties

Figure 8:
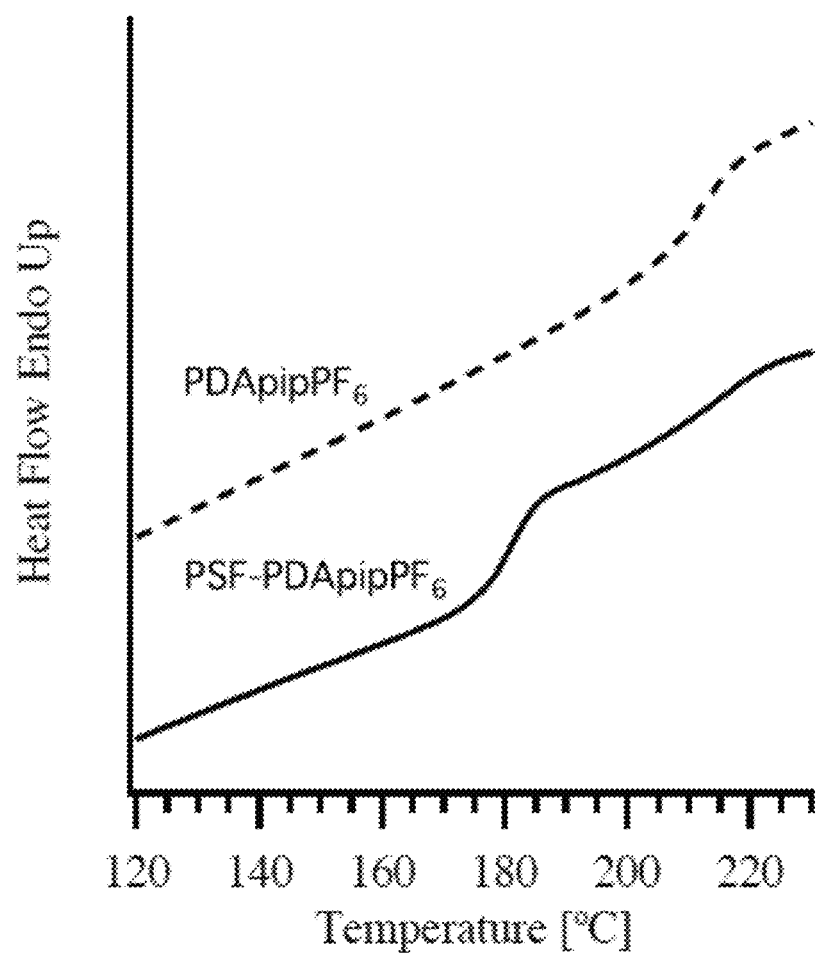
FIG. 8 illustrates DSC traces for PDApipPF6 homopolymer and PSf-PDApip1 copolymer.
Figure 9A:
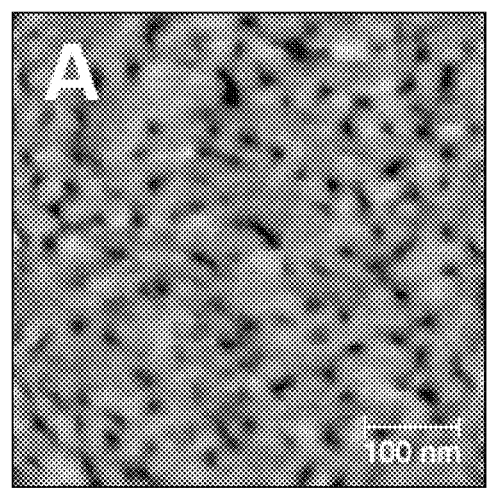
FIG. 9A illustrates a tapping mode-AFM image for PSf-PDApip1.
Figure 9B:
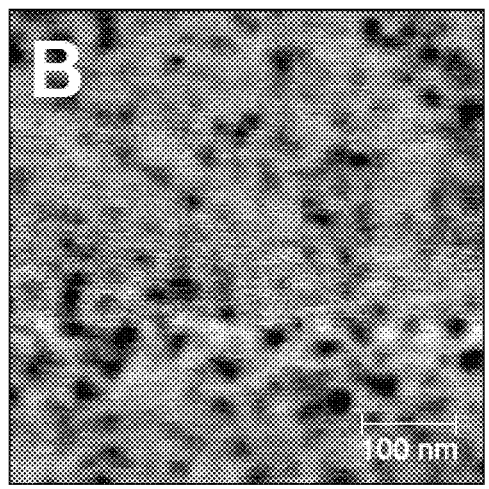
FIG. 9B illustrates a tapping mode-AFM image for PSf-PDApip2.
Figure 9C:
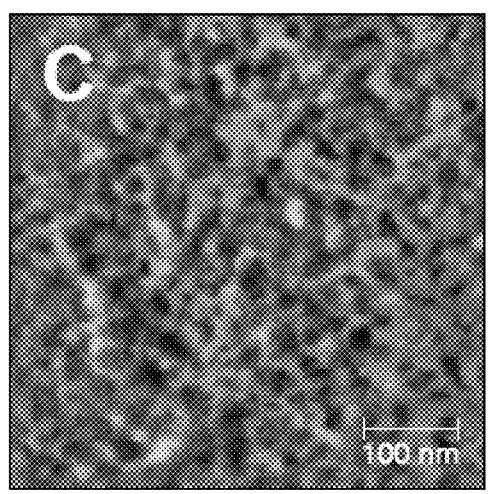
FIG. 9C illustrates a tapping mode-AFM image for PSf-PDApip3.
Figure 9D:
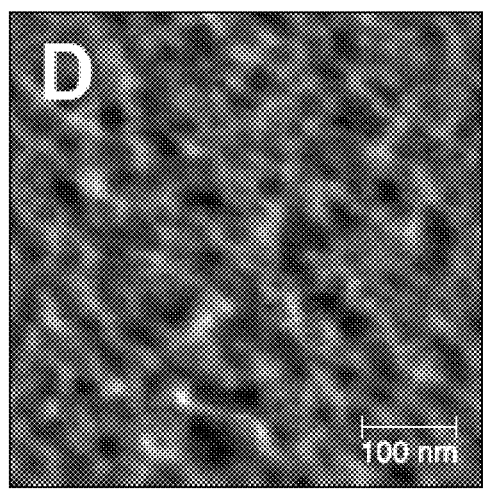
FIG. 9D illustrates a tapping mode-AFM image for PSf-PDApip4.

Multiblock copolymer membranes in the hexafluorophosphate form were found to be soluble in a range of polar aprotic solvents including DMAc, NMP and DMPU. PSf-PDApipPF6 multiblock copolymers were dissolved in DMAc and cast onto glass. The resulting membranes were found to be colorless and transparent. FIG. 8 illustrates DSC traces for PDApipPF6 homopolymer and PSf-PDApip1 copolymer. The heating rate was about 10° C. per minute.

The PSf-PDApipPF6 multiblock copolymer membranes were ion-exchanged to chloride. The ion exchange to chloride was performed for two reasons: chloride is easily titrated, and ion exchange can occur under a range of temperatures and concentrations without side degradation reactions. To facilitate the ion exchange from hexafluorophosphate, ammonium chloride was used owing to its significant solubility in water compared to the potassium salt, which is only slightly soluble. Membranes were soaked in saturated ammonium chloride in a 100° C. oil bath for 48 hours followed by repeated rinsing to remove excess salt. The conditions employed were presumed necessary to remove the large hexafluorophosphate counter ion, which also has comparatively less solubility compared to the chlorides in water. Once the membranes were ion exchanged and rinsed of excess salt, they were dried under vacuum.

PSf-PDApip membranes in the hexafluorophosphate form were somewhat stiff and susceptible to cracking; however, when the membranes were ion exchanged to chloride they were found to be tough and creaseable when dry. After ion exchange to chloride, the copolymers were rendered insoluble in all the above mentioned polar aprotic solvents, as well as insoluble in water, alcohols, acetonitrile, tetrahydrofuran, and chloroform. Insolubility in THF and chloroform, which are good solvents for polysulfone, provided more evidence for the success of the copolymerization. titrations of chloride were accomplished to further characterize each composition, ion exchange capacity, and also to determine quantitative removal of the hexafluorophosphate counter ion. Removal of the hexafluorophosphate counter ion is significant to regaining hydrophilicity in the PDApip segments and assisting in the exchange to hydroxide. Each material was titrated five times and the results show that the ion exchange capacities agreed well with the NMR spectroscopy determined values (Table 2).

Morphology of the Membranes

An important design feature of block and multiblock copolymers is that of microphase separation. It has been reported that anion exchange membranes from block copolymers have higher ionic conductivities and improved dimensional stability when compared to their random copolymer analogues. Microphase separation was determined by both DSC and AFM. FIG. 8 illustrates the DSC trace for both the PDApipPF6 homopolymer and the PSf-PDApipPF6 multiblock copolymer. The PDApipPF6 homopolymer indicated a clear endotherm corresponding to a glass transition (Tg) at 210° C. Copolymer PSf-PDApip1 was analyzed by DSC and compared to the PDApipPF6 homopolymer. The DSC trace for copolymer PSf-PDApip1 clearly indicated two endotherms at 180° C. and 210° C. corresponding to the glass transitions of polysulfone and the PDApipPF6 homopolymer. The weak endotherm observed at 210° C. is a result of the low weight percent of PDApip in the copolymer composition. Additionally, no observable decrease in the Tg was observed for the PDApip segments in the copolymer, indicating immiscibility of the blocks.

Tapping mode AFM was used to elucidate the surface morphology for each of the PSf-PDApipPF6 multiblock copolymers. As indicated by the phase images in FIGS. 9A-9D, microphase separation is observed in all of the copolymer compositions, as was suggested by the above DSC analysis. The as cast films were not annealed and do not show highly ordered domains. It was determined that the dark portions of each image increase as the weight percent of PDApipPF6 increases in the copolymer composition, thereby corresponding to the PDApipPF6 segments. Analysis of the phase profile for each copolymer sample showed that the domain spacing between the dark segments was inversely proportional to the composition, with the domain spacing decreasing from 53 to 38 nm with the increase in PDApip composition. The lack of long range order notwithstanding, the two higher composition copolymers, PSf-PDApip3 and PSf-PDApip4, indicated well connected networks of PDApipPF6. The implication of the observed microphase separation, as will be indicated below, is that the water uptake and ultimately the hydroxide conductivity were influenced.

Water Uptake and Hydroxide Conductivity

The water uptake and hydroxide conductivity of the PSf-PDApipOH membranes were measured at room temperature and further evaluated in a range of temperatures up to 80° C. As illustrated in Table 3, the water uptake of each of the synthesized membranes increased with IEC, ranging from 14 to 36% at room temperature, with the most significant difference occurring between membranes PSf-PDApip1 and PSf-PDApip2.

TABLE 3

| Membrane | IEC (OH-) (meq/g) | Hydroxide Conductivity (mS/cm) | | | | | EA (kJ/mol) |
|---|---|---|---|---|---|---|---|
| | | RT | 40° C. | 60° C. | 80° C. | 80° C. | |
| PSF-PDApip1 | 0.9 | 14 ± 0.2 | 18 ± 0.2 | 23 ± 0.5 | 25 ± 0.5 | 22 ± 0.2 | |
| PSF-PDApip2 | 1.29 | 29 ± 0.3 | 38 ± 0.2 | 50 ± 0.2 | 60 ± 0.3 | 60 ± 0.8 | 8.8 |
| PSF-PDApip3 | 1.53 | 35 ± 0.5 | 47 ± 0.3 | 63 ± 0.2 | 79 ± 0.7 | 74 ± 1.3 | 11.1 |
| PSF-PDApip4 | 2.02 | 51 ± 0.6 | 64 ± 0.3 | 79 ± 0.6 | 102 ± 1.2 | | 12.3 |
| Nafion 117 | 0.92 | 80 ± 0.06 | 105 ± 0.4 | 132 ± 0.5 | 158 ± 0.8 | | 10.1 |

Figure 10:
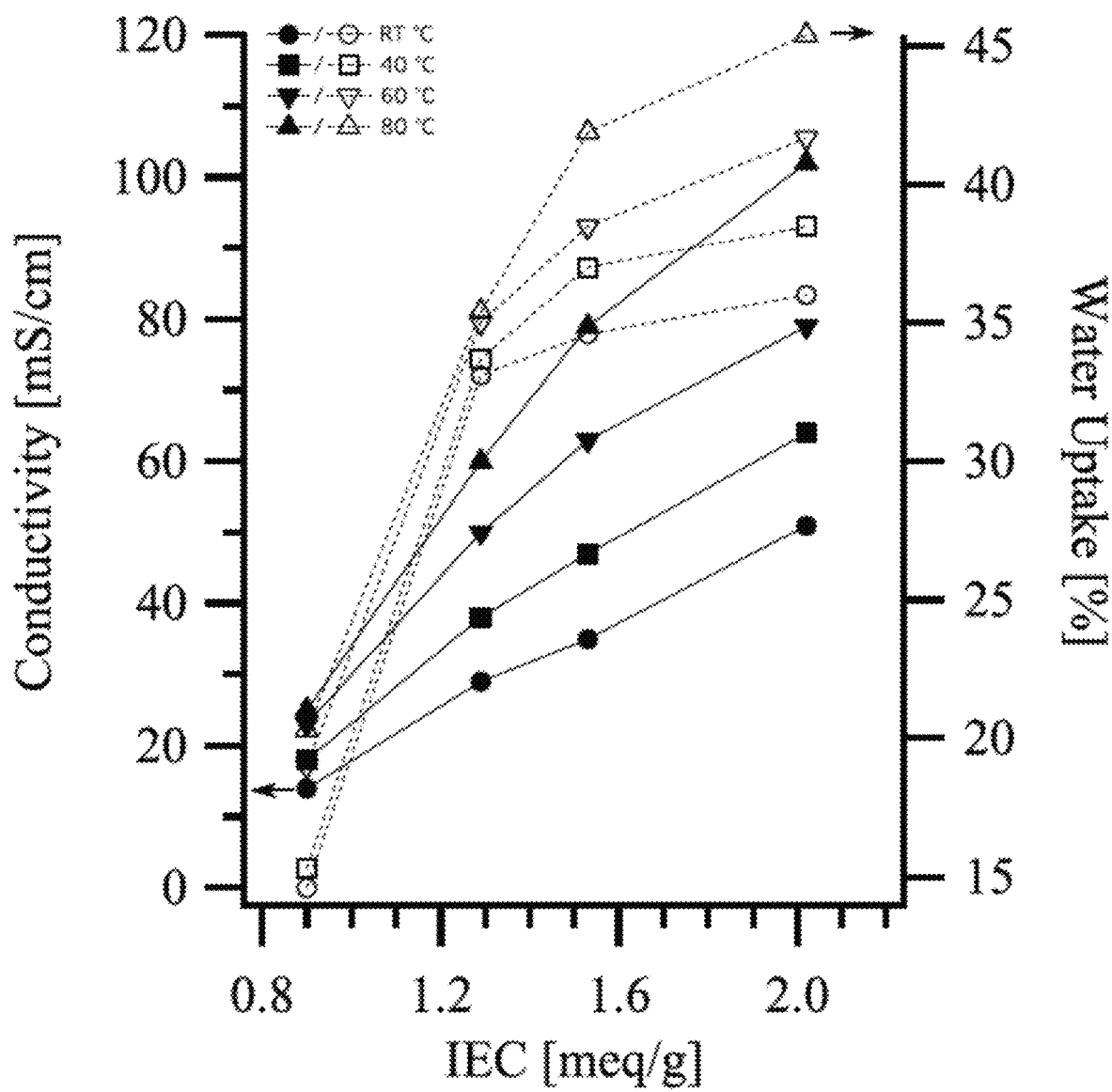
FIG. 10 illustrates the activation energy for the materials illustrated in FIG. 8 calculated from the Arrhenius plot.
Figure 11:
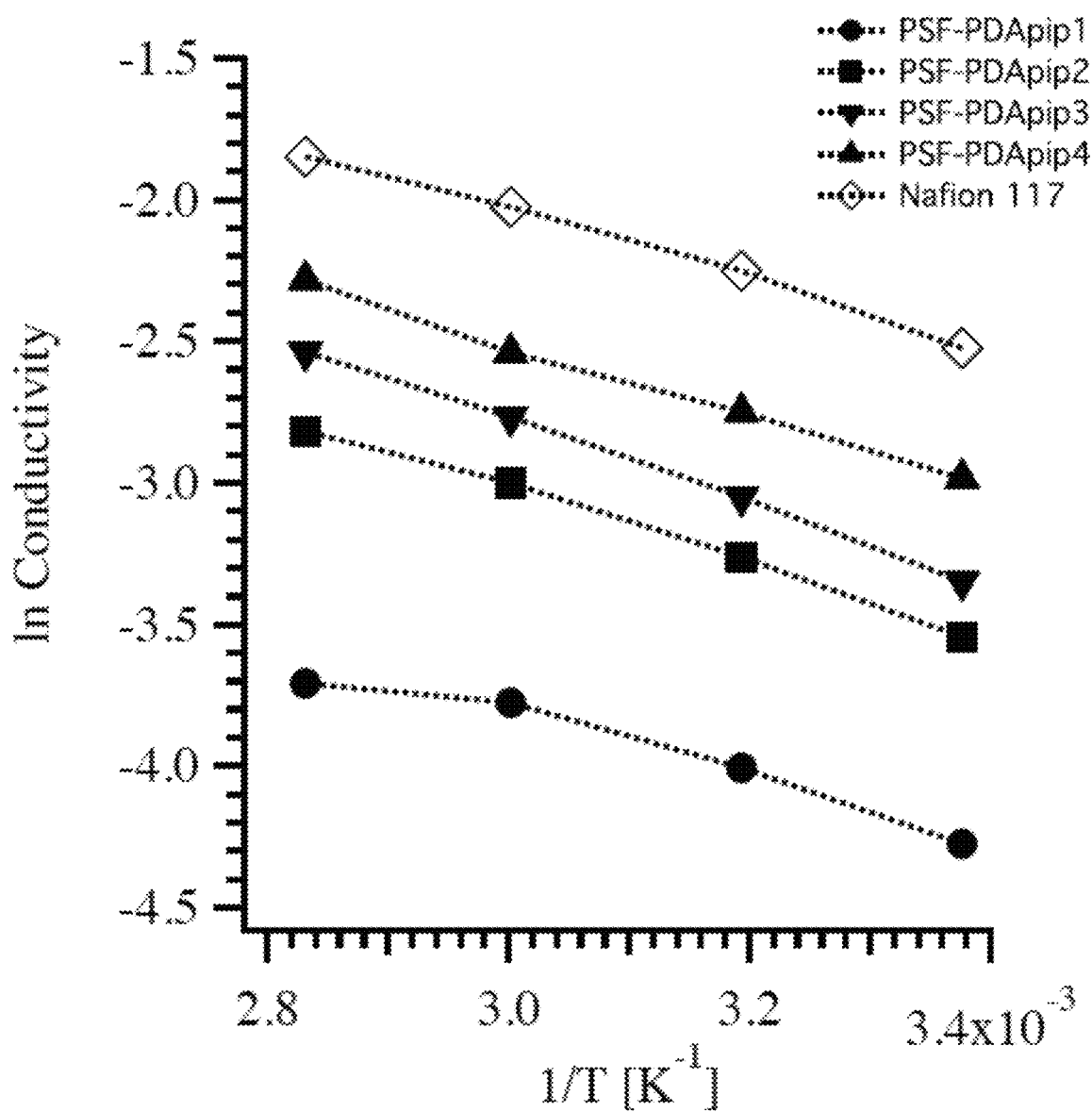
FIG. 11 illustrates the relationships of both hydroxide conductivity and water uptake with the IEC over a range of temperatures.

Presumably, the large increase of water uptake between membranes PSf-PDApip1 and PSf-PDApip2 (IECs 0.90 and 1.29 meq/g) is an indication of a threshold increase in the connectivity of the hydrophilic domains. It is presumed that the phase separated nature of the PSf-PDApip membranes contributed to the relatively low water uptake. The hydroxide conductivity for the PSf-PDApipOH membranes was evaluated in 18 MΩ water at room temperature and further from 40-80° C. As indicated in Table 3, the data shows that the hydroxide conductivity increases with increasing IEC. FIG. 10 depicts the relationships of both hydroxide conductivity and water uptake with the IEC over a range of temperatures. Temperature was determined to have the most significant influence on conductivity performance. As an example, the PSf-PDApip4 membrane, having an IEC of 2.02 meq/g, doubled in hydroxide conductivity from room temperature to 80° C. while the water uptake only increased by 9 wt %. The temperature dependence on conductivity can be rationalized by the activation energy for hydroxide anion transport. The activation energy was calculated from the Arrhenius plot, FIG. 11, for the PSf-PDApip membranes (and compared with that measured for Nafion 117) and was found to range from 9-12 kJ/mol. The calculated activation energies of the PSf-PDApip membranes were similar to the 10 kJ/mol activation energy for Nafion 117. The high conductivity performance observed for the PSf-PDApip membranes suggests that the well-connected, conductive domains observed by AFM, were a major contributing factor in the performance.

Base Stability

Figure 12A:
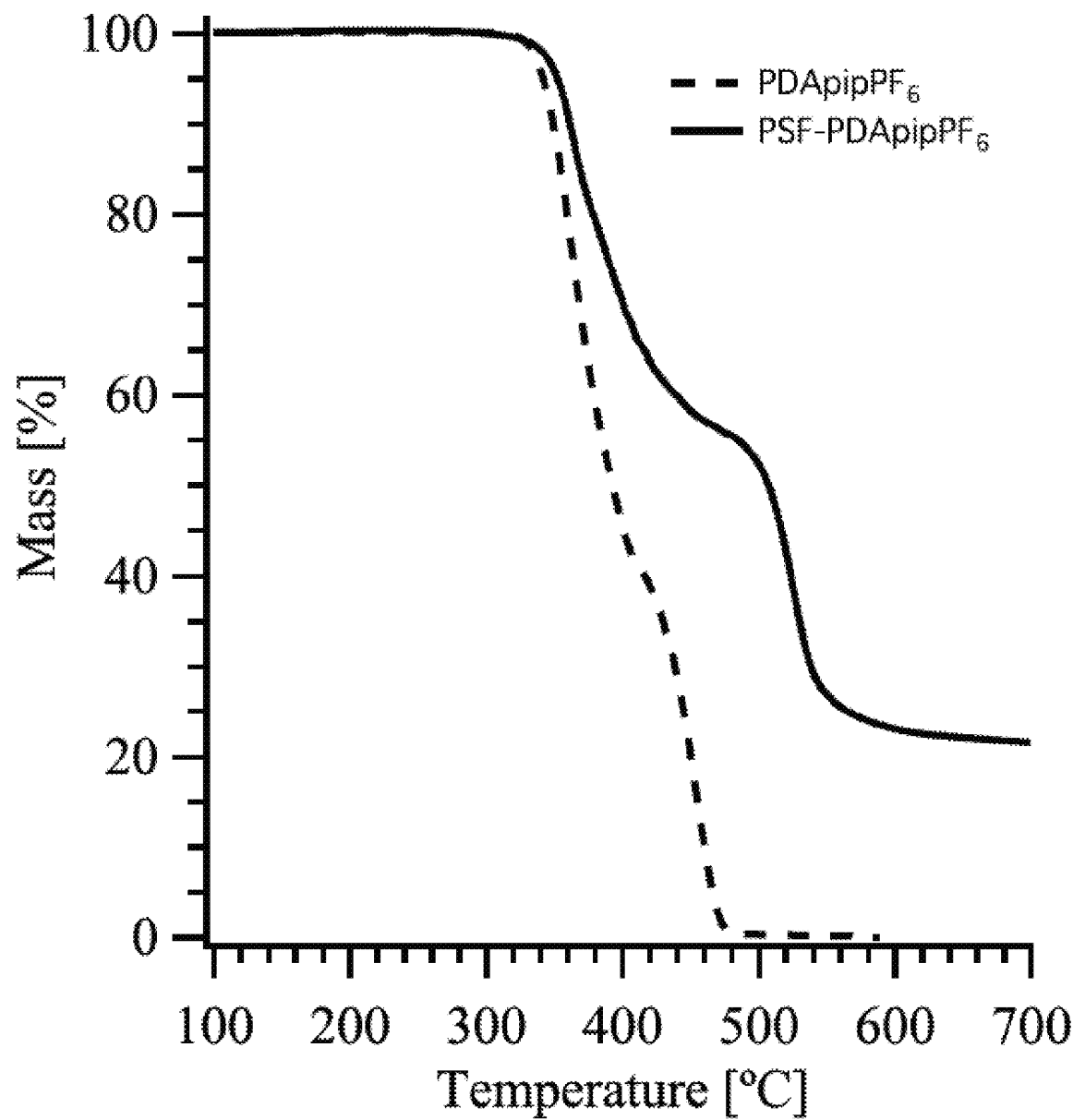
FIG. 12A illustrates the thermal decomposition data for PDApipPF6 homopolymer and PSf-PDApip2 copolymer.
Figure 12B:
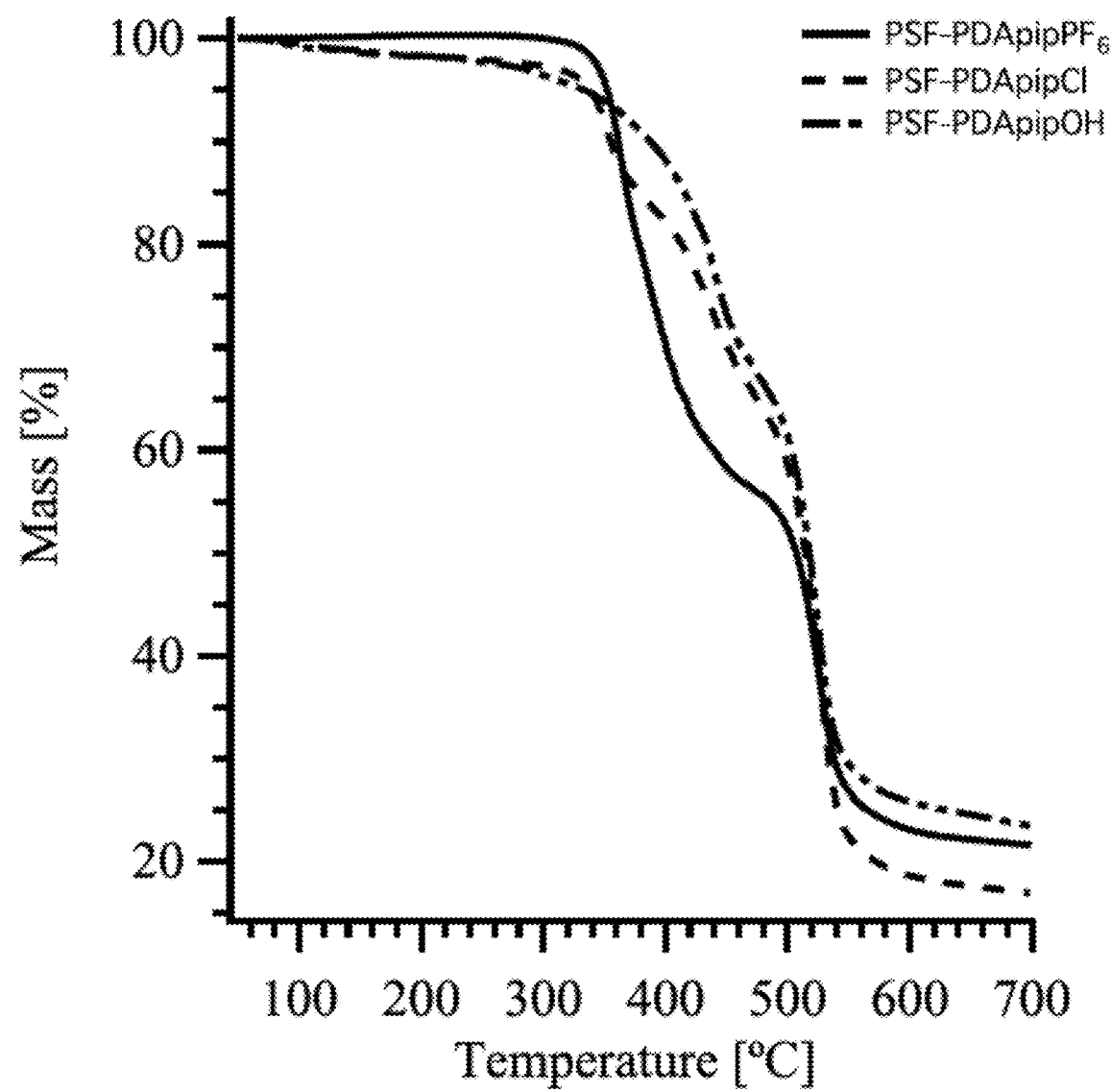
FIG. 12B illustrates the comparison of PF6-, Cl— and HO— counter ions.

Tolerance to a highly basic environment at elevated temperatures is key to anion exchange membrane performance, and was considered in the design of the current polymer structures. Spirocyclic ammonium small molecule cations have been previously shown to be highly stable compared the more typical tetraalklylammonium and imidazolium cations. Currently, there exists one study of spirocyclic ammonium functionalized AEM, however the spirocyclic ammonium cations were not fully aliphatic and significantly degraded at 60° C. The base tolerance of the PDApipOH homopolymer at 80° C. in a 1M KOH/methanol-d4 solution using the conditions in an established procedure as described in K. M. Hugar, H. A. Kostalik and G. W. Coates, Imidazolium cations with exceptional alkaline stability: a systematic study of structure-stability relationships, *J. Am. Chem. Soc.*, 2015, 137, 8730-8737, which is incorporated by reference in its entirety. The test was conducted for 1000 hours with samples periodically examined by 1H NMR spectroscopy, FIGS. 12A and 12B. FIG. 12A illustrates the thermal decomposition data for PDApipPF6 homopolymer and PSf-PDApip2 copolymer. FIG. 12B illustrates the comparison of PF6-, Cl— and HO— counter ions. It was determined that over the entirety of the experiment no observable Hoffman elimination took place, as evidenced by the lack of development of any vinyl signals in the 1H NMR spectra. Furthermore, the spectra for each of the samples taken at 0, 7, and 42 days do not indicate any new proton signals arising from any substitution reactions and the integration areas of the peaks were maintained, further indicating that the PDApipOH homopolymer was highly stable under the testing conditions.

Base stability for the synthesized PSf-PDApipOH multiblock copolymers was also evaluated by thermal gravimetric analysis (TGA) and measurements of conductivity loss. TGA was conducted on both the PDApip homopolymer and the PSf-PDApip2 multiblock copolymer membrane while in the hexafluorophosphate form (FIG. 12(B)) to provide a baseline of their corresponding thermal stabilities. Analysis of the TGA data indicated that the 5% weight loss for the PDApipPF6 homopolymer and PSf-PDApip2 copolymer occurred at 354° C. and 352° C., respectively. An additional degradation step was observed at 480° C. in the PSf-PDApip2 copolymer, corresponding to the degradation of the polysulfone backbone. The 5% weight loss for the PSf-PDApip2 copolymer was further evaluated in both the chloride and hydroxide forms (FIG. 12B) and was found to be 346° C. and 360° C., respectively. The small weight loss occurring between 100 and 200° C. was presumed to be loss of residual water for the copolymers with the more hydrophilic counterions. The exceptionally high degradation temperatures found for the PDApip homopolymers and PSf-PDApip copolymer, regardless of counterion, demonstrate the significant base stability of the particular spirocylic group. Comparatively, the benzyltrimethylammonium (BTMA) hydroxide small molecule, polymers functionalized with BTMA, dimethylbenzimidazolium hydroxide, N-methylpiperdinium hydroxide, and N-methylpyrrolidinium hydroxide have all been similarly examined, with the highest thermal stability reported at 260° C. The PSf-PDApipOH materials show a dramatically greater thermal stability. Conductive stability after prolonged exposure to high pH and temperature conditions is the ultimate test of alkaline tolerance. PSf-PDApip membranes used for initial conductivity measurements were exposed to 1 M KOH at 80° C., and their conductivity was re-evaluated (Table 4). After 120 hours of exposure, the PSf-PDApip membranes did indicate a small loss of conductivity performance. PSf-PDApip1 and PSf-PDApip3 membranes indicated an approximately 8% and 6% loss of hydroxide conductivity, respectively, while PSf-PDApip2 did not show any measurable loss of conductivity from exposure to base. While only a small loss of conductivity is observed for the samples, the materials were observed to embrittle and PSf-PDApip4 cracked while placing it in the probe for analysis after hydroxide exposure.

Example 3

Experiments were performed to investigate the influence of hydrophilic segment composed of aliphatic spirocyclic repeat units of various molecular weights on the performance of anion exchange membranes given similar composition. Reports have indicated that the hydroxide conductivity of AEMs is strongly affected by the phase separation and morphology. It was believed that the hydroxide conductivity of multiblock PSf-PDApipOH copolymers would vary depending on the molecular weight of the hydrophilic PDApipOH segments. A series of PSf-PDApipOH multiblock copolymer membranes were designed and made of similar composition and IEC in which the molecular weight of the conductive PDApipOH segments are varied.

Synthesis of 4-Fluorophenyl Sulfone Terminated PDApipPF$_6$ Oligomers

Figure 13:
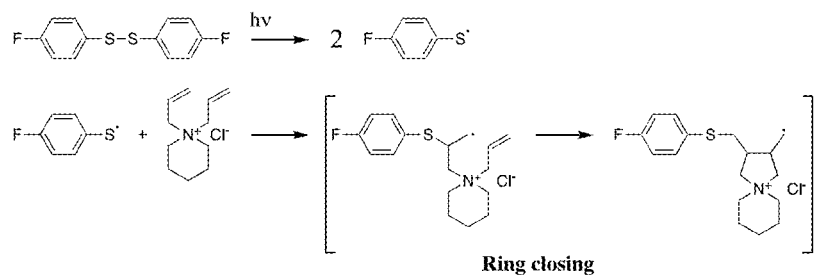
FIG. 13 illustrates a UV initiated cyclopolymerization of N,N-diallylpiperdinium chloride in the presence bis(4-fluorophenyl) disulfide.
Figure 13:
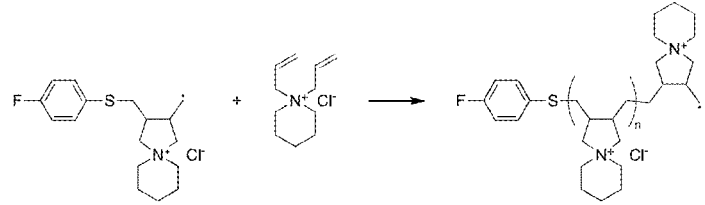
Figure 13:
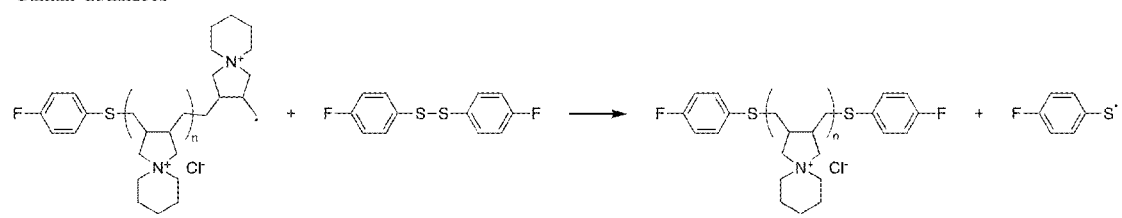
Figure 13:
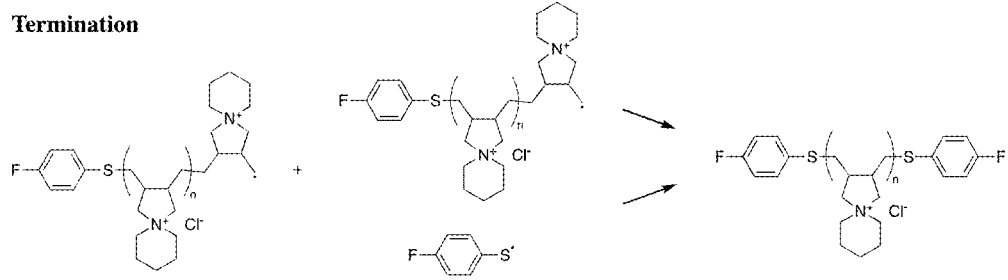

In the present experiment, a series of α, ω-4-fluorophenyl sulfone PDApipPF$_6$ oligomers of varying molecular weight were produced to be subsequently incorporated in a polysulfone synthesis. Polymerization reactions were completed in a 3:1 methanol/water solvent system with monomer: initiator ratios of 75:1, 100:1 and 125:1. Following polymerization, the α, ω-4-fluorophenyl sulfide oligomers were oxidized with Oxone to the 4-fluorophenyl sulfone derivatives and ion exchanged to the PF$_6$ form. 4-fluorophenyl sulfone terminated PDApipPF$_6$ oligomers produced from a single monomer:initiator ratio of 100:1 and the resultant polymers are confirmed to be difunctional by their ability to produce high molecular weight multiblock PSf-PDApipPF$_6$ copolymers. By extension, using the same polymerization conditions with different monomer:initiator feed ratios, different α, ω-4-functionalized oligomers should be produced. FIG. 13 illustrates a UV initiated cyclopolymerization of N,N-diallylpiperdinium chloride in the presence bis(4-fluorophenyl) disulfide.

Figure 14:
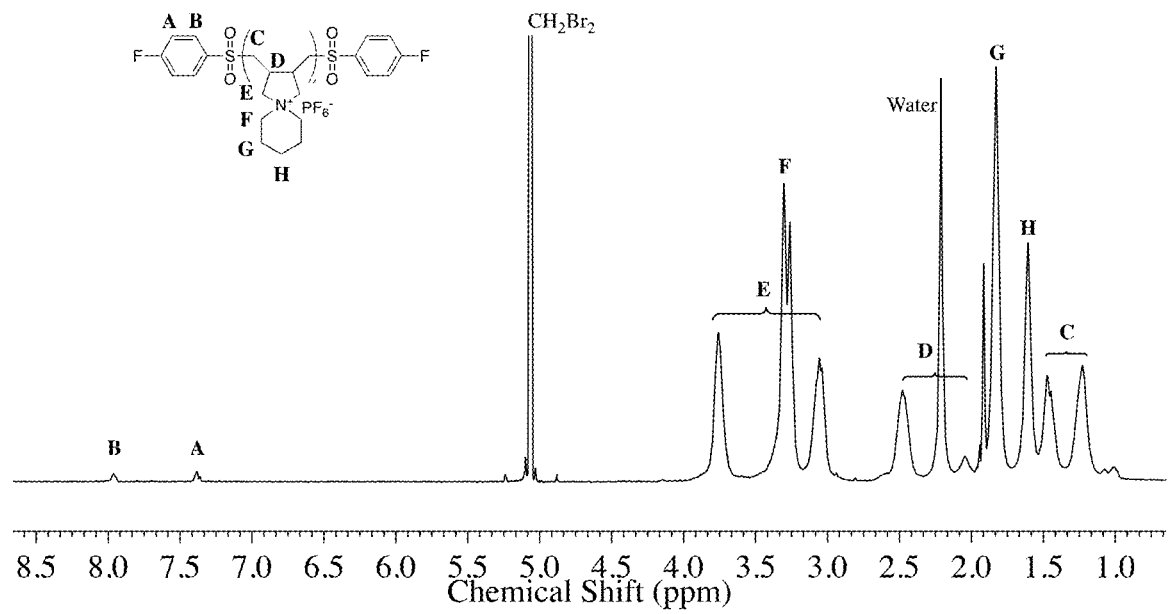
FIG. 14 illustrates a $^1$H NMR spectrum of PDApip3.

$^1$H NMR spectroscopy was used to determine the polymer structure and evaluate the number average molecular weight ($M_n$) of the 4-fluorophenyl sulfone terminated PDApipPF$_6$ oligomers. The $^1$H NMR spectrum (FIG. 14) confirmed the formation of 5-member rings, resulting in spirocyclic repeat units, and the presence of 4-fluorophenyl sulfone end groups. The polymer structure and peak assignment are supported by existing literature investigating the cyclopolymerization of diallylammonium monomers. Advantageous to determining molecular weight, the 4-fluorophenyl sulfone end groups have spectroscopically unique peaks in the $^1$H NMR spectra associated with the aromatic ring. The molecular weight of the 4-fluorophenyl sulfone terminated PDApipPF$_6$ oligomers was determined by calculating the degree of polymerization (DP). The DP was obtained by comparing integrals associated with the 4-fluorophenyl sulfone end groups (peak A, 4H) and the PDApipPF$_6$ repeat units (downfield E, 2H, at 3.8 ppm). The molecular weights for the 4-fluorophenyl sulfone terminated PDApipPF$_6$ oligomers are provided in Table 4. Additionally, the concentration of 4-fluorophenyl sulfone end groups per known mass of polymer was determined from the $^1$H NMR spectra. The addition of a known mass of methylene bromide to NMR samples containing a known mass of polymer produced NMR spectra with a spectroscopically unique standard peak. The mass of 4-fluorphenyl sulfone end groups per mass of polymer was then determined by comparison of the integral values associated with the 4-flurophenyl sulfone end groups and the methylene bromide. It was assumed that determination of the 4-fluorophenyl sulfone end group concentration by directly measuring it from NMR spectroscopy, as described, was more accurate compared to calculating the concentration in a known quantity based on the molecular weight determined from the NMR spectra. The molecular weight determined from NMR spectroscopy assumes that each chain is difunctional therefore the ratio of end groups to repeat units gives the degree of polymerization (DP) and a molecular weight estimation. However, the molecular weight determined by this method would not account for a mixture of counterions so, it was assumed to be a less reliable description of end group concentration. Furthermore, for simplicity the molecular weights presented below are all calculated in the hydroxide form, not only because hydroxide is the counter ion for the application it is also directly measured and supports copolymer composition.

TABLE 4

| Sample | [BFPDS]:[DApip] | DP | $M_n$ [g · mol$^{-1}$] | Conversion [%] |
|---|---|---|---|---|
| PDApip4 | 1:75 | 35 | 6,400 | 22 |
| PDApip5 | 1:100 | 73 | 13,300 | 37 |
| PDApip6 | 1:125 | 94 | 17,200 | 27 |

The DP was determined from $^1$H NMR spectra, and the Mn was calculated in the hydroxide form.

PDApipPF$_6$ oligomers with increasing DP were produced by the UV initiated cyclopolymerization of N,N-diallylpiperidinium chloride by increasing the monomer to initiator ratio. The molecular weights of the oligomers were calculated from the DP (Table 4). The molecular weights of the oligomers depend on the identity of the counterion, with different molecular weights for the repeat unit of a given oligomer in the PF6 (311.25 g·mol$^{-1}$) versus the hydroxide (183.30 g·mol$^{-1}$) form. The molecular weights of the oligomers in the PF6 form were determined to be 10,900, 22,700, and 29,200 g·mol$^{-1}$ for PDApip1, PDApip2, and PDApip3, respectively and 6,400, 13,300 and 17,200 g·mol$^{-1}$ for the three oligomers when calculated in the hydroxide form.

Figure 15:
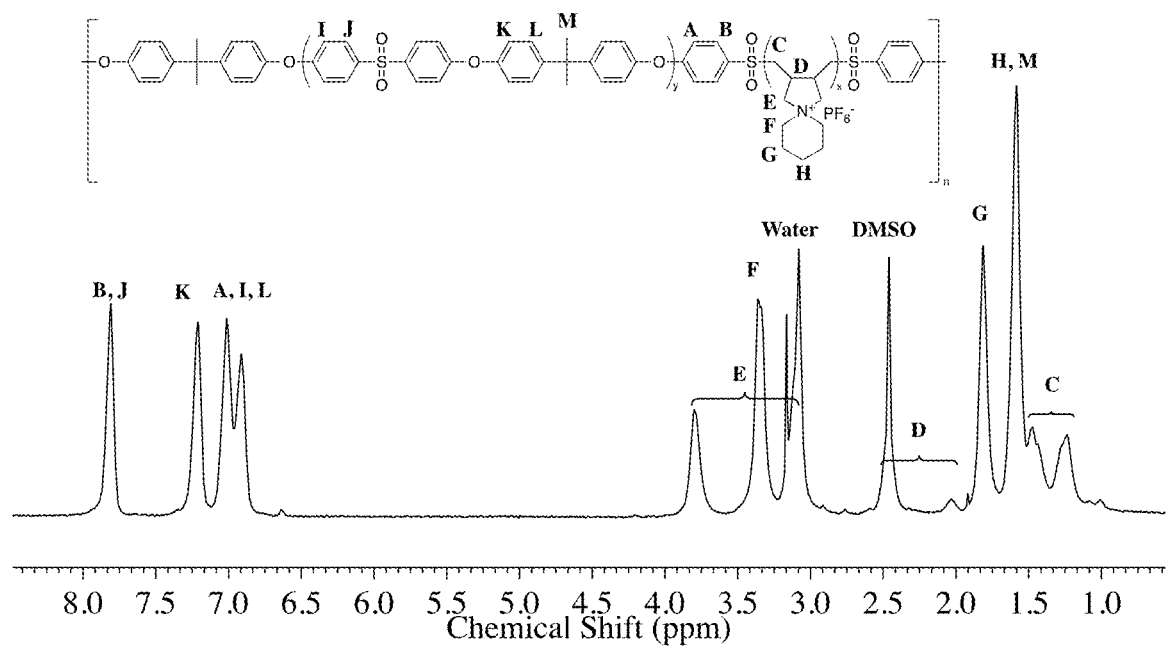
FIG. 15 illustrates a $^1$H NMR spectrum of PSf-PDApip3.

Multiblock copolymers were produced by condensation polymerization of the preformed 4-fluorophenyl sulfone functionalized PDApipPF$_6$ oligomers with the polysulfone monomers, bisphenol A and bis(4-fluorophenyl) sulfone. The objective of the polymerizations was to produce a series of PSf-PDApip mulitblock copolymers with consistent weight fraction of PDApipOH (targeted at 40 wt. %) from the different molecular weight PDApipPF$_6$ starting materials. The different copolymers with the same weight fraction of PDApipOH would have the same IEC and allow for the determination of property differences related to oligomer chain length. The copolymerizations produced materials in yields greater than 90%. The mole percent of PDApip incorporated into the PSf-PDApip copolymers was calculated from the $^1$H NMR spectra. Compositions of the PSf-PDApip multiblock copolymers were determined by comparing peak integrals associated with the PSf repeat unit (B, 4H) and the PDApip repeat unit (downfield E, 2H at 3.8 ppm) as illustrated in FIG. 15. It was assumed that the contribution of the PDApip end groups to the B peak associated with the PSf repeat units was negligible. The weight percentage of PDApip in the copolymers was determined by calculation using the molecular weight of the oligomers in the hydroxide form (Table 5).

TABLE 5

| Sample | DP$^a$ | PDApipOH $M_n$ [g · mol$^{-1}$] | PDApipOH mol. % | PDApipOH wt. % |
|---|---|---|---|---|
| PSf-PDApip4 | 35 | 6,400 | 58.6 | 36.9 |
| PSf-PDApip5 | 73 | 13,300 | 61.0 | 39.3 |
| PSf-PDApip6 | 94 | 17,200 | 59.6 | 37.9 |

PDApipOH Mn and PDApipOH (mol %) were determined from the $^1$H NMR spectrum and PDApipOH (wt. %) was calculated from the mole percent (based on hydroxide).

Membrane Formation and Ion Exchange to Hydroxide

The PSf-PDApip multiblock copolymers were fabricated into AEMs by solvent casting followed by ion exchange. The multiblock copolymers were dissolved in DMAc and the solutions were drop cast onto glass slides held at 75° C. The resulting membranes were found to be colorless and transparent. The PSf-PDApipPF$_6$ multiblock copolymer membranes were ion exchanged to hydroxide following an ion exchange first to bromide. In this study, ion exchange to bromide under milder conditions was found to be an effective intermediate step and was completed by soaking the membranes in saturated ammonium bromide at room temperature over 72 hours followed by repeated washings to remove the excess salt. Ion exchange to hydroxide was then accomplished by soaking the PSf-PDApipBr membranes in 1 M KOH and rinsing the membranes with N2 purged 18 MΩ water.

Physical Properties: IEC and Water Uptake

Back-titration of hydroxide in the PSf-PDApipOH multiblock copolymer membranes was completed in order to determine the complete removal of $PF_6$ and to characterize the IEC of each membrane. Removal of $PF_6$ from the $PSf-PDApipPF_6$ membranes is important for the accurate characterization of the water uptake and hydroxide conductivity due to the increased hydrophobic character and bulk of the $PF_6$ counterion. The membranes were neutralized in a standardized HCl solution. Following neutralization, the remaining acid solutions were titrated five times to obtain the IEC for the membranes (Table 6). The IEC values determined by back-titration of hydroxide are shown to be in close agreement with the IEC values estimated from the composition for the PSf-PDApipOH multiblock copolymers determined by NMR spectroscopy. The slightly lower IECs obtained by titration compared to the values obtained by NMR spectroscopy could possibly be attributed to incomplete ion exchange.

TABLE 6

| Membrane | IEC $^1$H NMR [mmol · g$^{-1}$] | IEC [HO$^-$] [mmol · g$^{-1}$] | Water Uptake [wt. %] | [mS · cm$^{-1}$] |
| --- | --- | --- | --- | --- |
| PSf-PDApip4 | 2.02 | 1.86 ± 0.04 | 17.0 ± 0.010 | 37.5 ± 0.3 |
| PSf-PDApip5 | 2.14 | 1.99 ± 0.07 | 21.8 ± 0.015 | 47.4 ± 0.6 |
| PSf-PDApip6 | 2.07 | 1.71 ± 0.07 | 19.4 ± 0.012 | 62.9 ± 1.9 |

The IEC 1H was determined from the $^1$H NMR spectrum composition and calculated in the hydroxide form. The IEC OH— is measured by back-titration of hydroxide. The water uptake was determined by DVS in the bromide form measured at 60° C. and 95% RH.

Water uptake is an important factor that affects ionic conductivity in AEMs. Evaluation of the water uptake using humidified air rather than liquid water is important for a more accurate assessment of membrane performance in applications that utilize humidified gases. Water absorbed in AEMs is known to dissociate the cationic groups of the membrane material and facilitate hydroxide transport. Membranes that exhibit higher water uptake tend to have higher hydroxide conductivity compared to membranes with lower water uptake. However, excessive water uptake can also have the deleterious effects of diluting the cations in the membrane material and decreasing the mechanical strength. The water uptake for the PSf-PDApip membranes were evaluated at 60° C. and 95% relative humidity in the bromide form by dynamic vapor sorption (DVS) (Table 6). The PSf-PDApipBr multiblock copolymer membranes showed low water uptake values of 17.0, 21.8, and 19.4 wt. % for PSf-PDApip1, PSf-PDApip2 and PSf-PDApip3 membranes, respectively. Evaluation of the water uptake was completed in the bromide from in order to eliminate the effects of carbonate and bicarbonate formation during the measurements. Minimal variability was observed in the water uptake measurements due to the membranes having similar IECs (from similar compositions). However, the slight variation in the composition of the three multiblock copolymer samples did result in the highest water uptake observed for the PSf-PDApip2 membrane, which was the membrane with the highest IEC. The modest water uptake values for the PSf-PDApipBr membranes were considered to be a result of the multiblock copolymer phase separation into hydrophobic and hydrophilic domains. The low water uptake values determined by DVS for the hydrophobic-hydrophilic PSf-PDApipBr copolymer membranes are similar to the low water uptake values of other hydrophobic-hydrophilic block copolymer membranes of the present invention.

Hydroxide Conductivity

Figure 16:
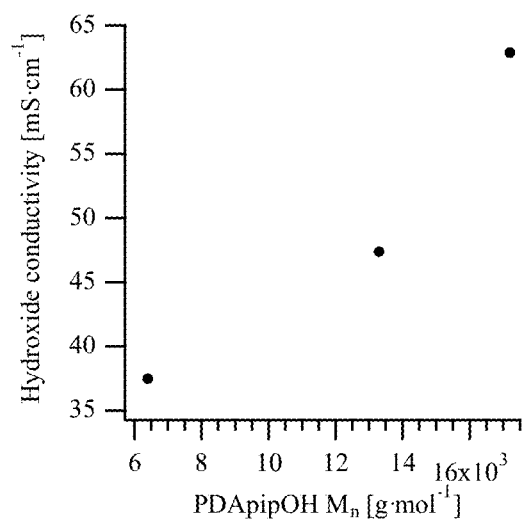
FIG. 16 illustrates a plot of hydroxide conductivity vs. PDApipOH segment molecular weight.

For alkaline fuel cell application, the hydroxide conductivity is of particular interest. It has been previously reported that AEMs derived from diblock copolymers of similar compositions with varying hydrophilic block lengths (prepared by controlled-living radical polymerization techniques) show an increase in hydroxide conductivity with increasing hydrophilic block length. This finding was attributed to the membrane morphology. The PSf-PDApipOH multiblock copolymer membranes were evaluated for their hydroxide conductivity at 60° C. and 95% RH. The results of the in-plane EIS experiments (FIG. 16) indicate that the hydroxide conductivity was strongly dependent on the segment length of the PDApipOH hydrophilic conductive segments. While there was some variation in the IEC from the slight variation in composition among the samples and the variation in IEC did have an effect on the water uptake (Table 6), the IEC and concomitant water uptake had a minimal impact on the conductivity compared to the segment length of the PDApipOH segments. Illustrating this effect, the PSf-PDApip1 membrane (IEC=1.86), which was synthesized from PDApip1 (DP=35; $M_n$=6,400 g·mol$^{-1}$) had a hydroxide conductivity of 37.5 mS·cm$^{-1}$. In contrast, the PSf-PDApip3 membrane (IEC=1.76), which was synthesized from PDApip3 (DP=94; $M_n$=17,200 g·mol$^{-1}$) had a hydroxide conductivity of 62.9 mS·cm$^{-1}$. These results indicate that the nanoscale, conductive domains in the PSf-PDApip membranes are largely responsible for the membrane performance. With respect to multiblock PSf copolymer AEMs, there are reports in which the composition of materials has been investigated and by extension, membranes with similar composition but different segment molecular weights. Hu et al., Fluorenyl-containing Quaternary Ammonium Poly(arylene ether sulfone)s for Anion Exchange Membrane Applications. *Fuel Cells* 2016, 16 (5), 557-567 (which is incorpoated by reference) produced a series of benzyltrimethyl ammonium functionalized membranes (IEC~1.3) wherein the hydroxide conductivity at 60° C. increased from 15.4 to 29.4 mS·cm$^{-1}$. However, the phase separation of the membranes was not investigated. In contrast, there are several studies of multiblock PSf copolymer AEMs wherein no discernable trend in the relationship between segment molecular weight and hydroxide conductivity was observed.

Membrane Phase Separation

Figure 17A:
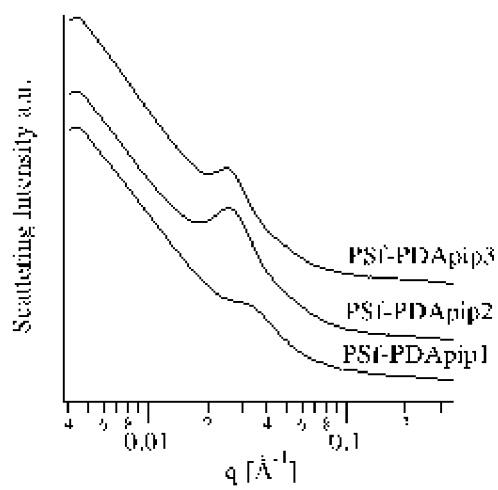
FIG. 17A illustrates a SAXS profile for PSf-PDApipBr membranes at 60° C. and 0% RH.
Figure 17B:
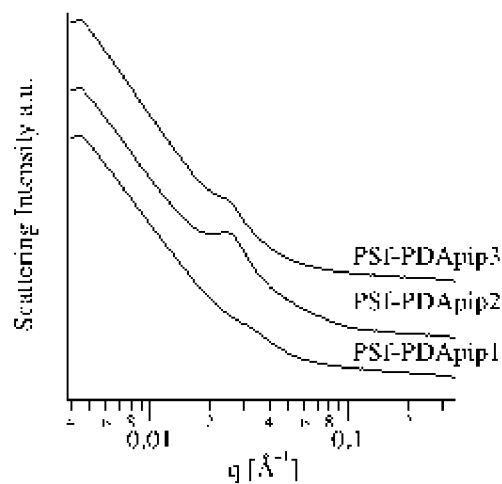
FIG. 17B illustrates a SAXS profile for PSf-PDApipBr membranes at 60° C. and 95% RH.

Developing AEMs with hydrophobic-hydrophilic phase separated morphology is important for the formation of well-connected hydroxide conducting domains. SAXS characterization of AEMs has been employed to determine the Bragg spacing between formed ionic clusters and the phase separated morphology of the bulk material. The multiblock copolymer PSf-PDApipBr membranes were investigated by SAXS in order to characterize the phase separation. The SAXS profiles for the PSf-PDApipBr membranes were obtained at 60° C. under dry and 95% RH conditions as illustrated in FIGS. 17A and 17B. FIG. 15A is dry and FIG. 15B is under 95% relative humidity. In FIG. 17A, the PSf-PDApip2 and PSf-PDApip3 membranes exhibited strong scattering peaks corresponding to domain spacing of 24 and 25 nm, respectively. The PSf-PDApip1 membrane showed a weak scattering peak corresponding to a domain spacing of 18 nm, which was expected due to presumed lower molecular weight PSf segments occurring between the PDApipBr segments. The scattering peaks exhibited by the PSf-PDApipBr membranes was attributed to the aggregation of PDApipBr segments that result in hydrophilic domains. When the RH was increased to 95% the scattering intensity decreased for all of the PSf-PDApipBr membranes. The decrease in the intensity of the scattering peaks with increased humidity indicated that the water uptake disrupted the PDApipBr domains. However, the domain spacing did not change appreciably with the increase of RH, which indicated that the swelling was minimal and that the membranes exhibit dimensional stability. Additionally, the absence of secondary scattering peaks in the SAXS profiles indicates that the PSf-PDApipBr membranes did not form well-ordered morphological features.

Figure 18A:
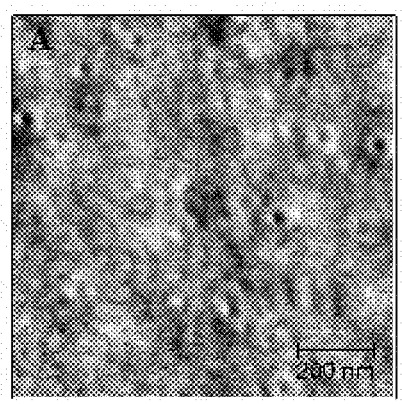
FIG. 18A illustrates a AFM phase image for PSf-PDApip4 (A) taken under ambient temperature and humidity.
Figure 18B:
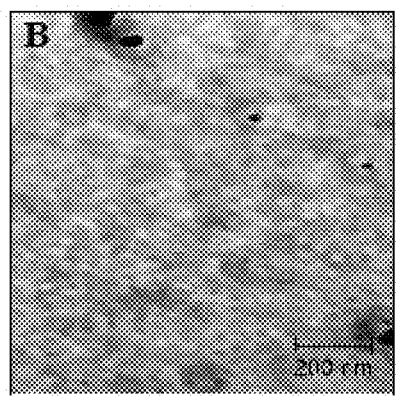
FIG. 18B illustrates a AFM phase image for PSf-PDApip5 taken under ambient temperature and humidity.
Figure 18C:
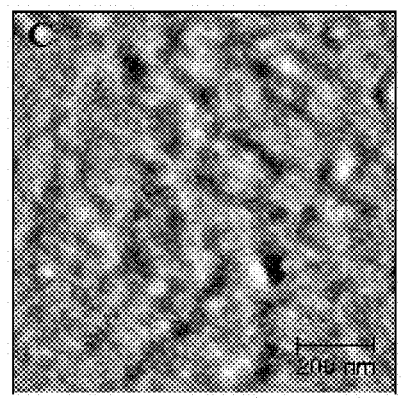
FIG. 18C illustrates a AFM phase image for PSf-PDApip6 taken under ambient temperature and humidity.

Although phase separation and the corresponding domain spacing for the PSf-PDApipBr membranes was indicated by SAXS, further investigation of the morphology is required to provide a more detailed characterization. TM-AFM was performed on the PSf-PDApipBr membranes to elucidate the surface morphology. Phase images were generated from membranes treated at 60° C. and 95% RH prior to measurement such that membrane phase separation would correlate closely to the SAXS and hydroxide conductivity measurements. The phase images produced illustrated in FIGS. 18A-18C clearly indicate hydrophobic-hydrophilic phase separation and the absence of well-ordered structures. The phase images also indicate that with increasing molecular weight in the PDApipBr segments connectivity of domains is improved and is most obvious between PSf-PDApip4 (FIG. 18A), PSf-PDApip5 (FIG. 18B) and PSf-PDApip6 (FIG. 18C). This result is due to the increase in segment length of the PDApipBr segments and supports the position and intensity of the SAXS scattering peaks. The improved connectivity of hydrophilic conductive pathways observed in the AFM images support the increase of the hydroxide conductivity with increasing PDApipOH segment length.

Figure 19A:
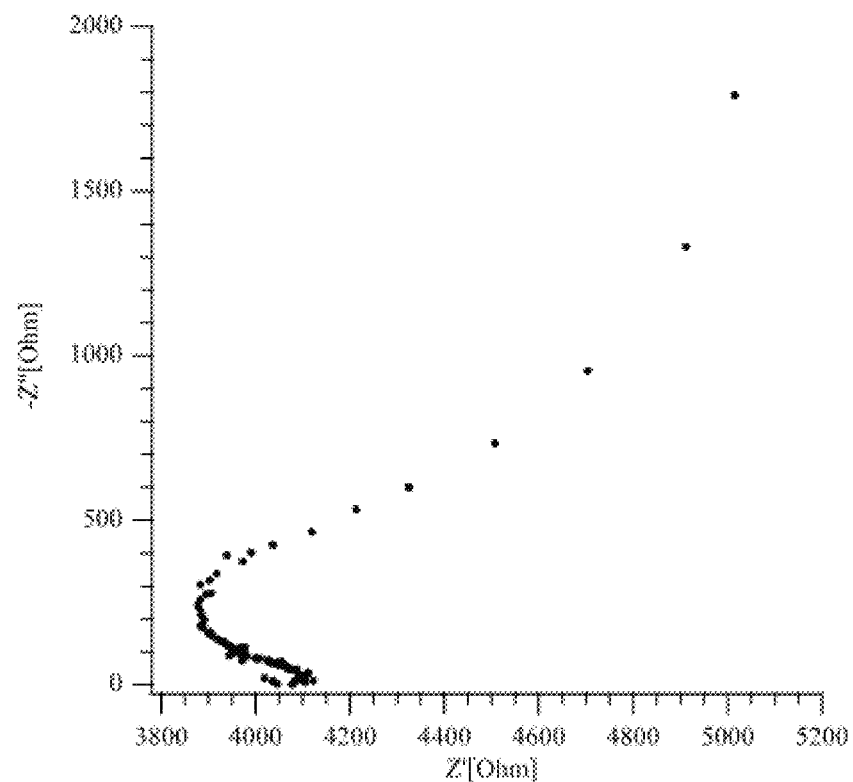
FIG. 19A illustrates a Nyquist graph of a membrane of the present invention.
Figure 19B:
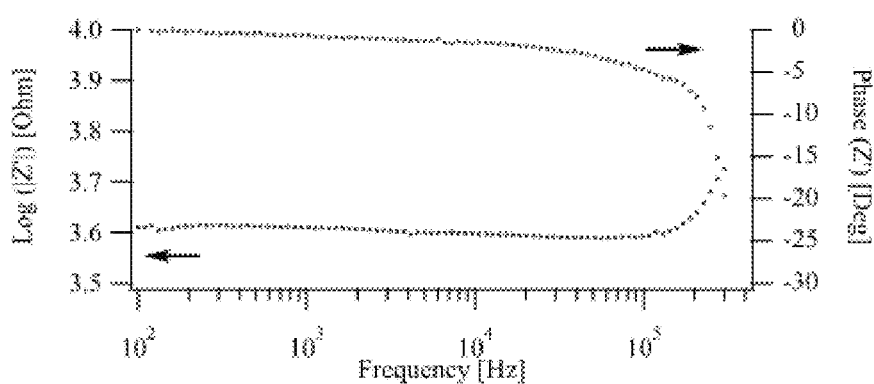
FIG. 19B illustrates a Bode plot of a membrane of the present invention.

The hydroxide conductivity for all membranes was measured in the frequency range of 100 Hz to 300 kHz. A Bode plot was used to validate the frequency range with constant impedance. The intercept on the real resistance axis in the Nyquist plot was taken as the membrane resistance R. A Nyquist graph is illustrated in FIG. 19A, while a Bode plot is illustrated in FIG. 19B.

Ranges have been discussed and used within the forgoing description. One skilled in the art would understand that any sub-range within the stated range would be suitable, as would any number within the broad range, without deviating from the invention. Furthermore, multiple aspects of the invention are described herein. One skilled in the art would understand that embodiments and aspects of the invention can be combined without deviating from the invention.

The foregoing description of the present invention related to polymers, membranes and monomers has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

The invention claimed is:

1. A method of forming a poly(diallylammonium) multiblock copolymer, comprising:
    mixing a diallylammonium polymer functionalized on a first end and a second end with a first group, a first difunctional monomer functionalized with a second group, and a second difunctional monomer functionalized with a third group to form a mixture; and
    reacting the mixture to form the poly(diallylammonium) multiblock copolymer,
    wherein the first difunctional monomer is a halophenyl sulfone and the second difunctional monomer is a bisphenol.

2. The method of claim 1, wherein the second group is the same as the first group.

3. The method of claim 1, wherein the first group is fluoride.

4. The method of claim 1, wherein the reacting comprises:
    heating the mixture in an inert environment at a temperature between about 100° C. and about 175° C. for between about 1.5 hours and about 24 hours to form a heated mixture;
    precipitating the heated mixture with an alcohol to form a precipitate; and
    separating the poly(diallylammonium) multiblock copolymer, wherein the poly(diallylammonium) multiblock copolymer is a polysulfone-poly(diallylammonium) multiblock copolymer.

5. The method of claim 1, wherein the poly(diallylammonium) multiblock copolymer comprises a first anion, wherein the first anion is selected from the group consisting of $PF_6^-$, $BF_4^-$, a halide, a hydroxide, a carbonate, a bicarbonate, a tosylate, an aryl sulfonate, and an alkyl sulfonate.

6. The method of claim 5, further comprising exchanging the first anion with a second anion selected from the group consisting of $PF_6^-$, $BF_4^-$, a halide, a hydroxide, a carbonate, a bicarbonate, a tosylate, an aryl sulfonate, and an alkyl sulfonate, wherein the first anion and the second anion are different.

7. The method of claim 1, wherein the diallylammonium polymer comprises at least one diallylammonium monomer selected from the group consisting of a diallyldimethyl, a diallyldiethyl, a diallyldipropyl, a diallyldibutyl, a diallyldipentyl, a diallyldihexyl, a cyclic diallyl, a diallylpiperidinium, and a diallylpyrrolidinuim.

8. The method of claim 1, wherein at least one of the first group and the second group is selected from the group consisting of a bisphenol, a di-alcohol, an alkyl dihalide, an aryl dihalide, a diamine, a dicarboxylic acid, and a dicarboxylic acid chloride.

9. The method of claim 1, wherein the reacting step comprises polymerizing the mixture with an iniferter.

10. The method of claim 9, wherein the iniferter is a photoinitiator, a chain transfer agent or a chain terminator.

11. The method of claim 1, wherein a weight fraction of the diallylammonium polymer in the poly(diallylammonium) multiblock copolymer is between about 0.1 and about 0.8.

12. The method of claim 4, further comprising, prior to the precipitating step:
    cooling the heated mixture to a temperature between about 15° C. and about 35° C. to form a cooled mixture; and
    diluting the cooled first mixture with a solvent to form a solution, wherein the ratio of the cooled mixture to the solvent is between about 2:1 and about 1:10.

13. The method of claim 12, wherein the solvent is N,N dimethylacetamide (DMAc).

14. The method of claim 9, wherein the iniferter is a disulfide and comprises a functional group of the iniferter selected from the group consisting of a halophenyl, a carboxylic acid, carboxylic acid chloride, an amine, an acid chloride, an alcohol, a phenol, an alkyl, a alkyl halide, an ester, an ether, and combinations thereof.

\* \* \* \* \*